(12) United States Patent
Chowdhary et al.

(10) Patent No.: US 8,489,528 B2
(45) Date of Patent: Jul. 16, 2013

(54) SYSTEMS AND METHODS FOR TRAINING NEURAL NETWORKS BASED ON CONCURRENT USE OF CURRENT AND RECORDED DATA

(75) Inventors: Girish V. Chowdhary, Atlanta, GA (US); Eric N. Johnson, Atlanta, GA (US); Seung Min Oh, Daejon (KR)

(73) Assignee: Georgia Tech Research Corporation, Atlanta, GA (US)

( * ) Notice: Subject to any disclaimer, the term of this patent is extended or adjusted under 35 U.S.C. 154(b) by 307 days.

(21) Appl. No.: 12/845,567

(22) Filed: Jul. 28, 2010

(65) Prior Publication Data
US 2011/0161267 A1 Jun. 30, 2011

Related U.S. Application Data

(60) Provisional application No. 61/229,079, filed on Jul. 28, 2009.

(51) Int. Cl.
*G06N 3/08* (2006.01)
(52) U.S. Cl.
USPC .................................. 706/21; 706/25
(58) Field of Classification Search
USPC .................................... 706/21, 25
See application file for complete search history.

(56) References Cited

U.S. PATENT DOCUMENTS

| | | | | |
|---|---|---|---|---|
| 5,748,847 A * | 5/1998 | Lo | | 706/14 |
| 5,812,992 A * | 9/1998 | de Vries | | 706/25 |
| 6,618,631 B1 * | 9/2003 | Johnson et al. | | 700/28 |
| 7,218,973 B2 * | 5/2007 | Johnson et al. | | 700/28 |
| 7,418,432 B2 * | 8/2008 | Calise et al. | | 706/23 |

OTHER PUBLICATIONS

Johnson E., Oh S., Adaptive Control Using Combined Online and Background Learning Neural Network, 43rd IEEE Conference on Decision and Control, Dec. 14-17, 2004,pp. 5433-5438, Atlantis, Paradise Island, Bahamas.*
Jianmin X. et al., Neural-Network-Based Model Reference Adaptive Control, IEEE TENCON, 1993, pp. 257-260,Beijing.*
Yi Y. et al., Implementation of an Artificial-Neural-Network-Based Real-Time Adaptive Controller for an Interior Permanent-Magnet Motor Drive, IEEE Transactions on Industry Applications, vol. 39, No. 1,pp. 96-104, Jan./Feb. 2003.*

(Continued)

*Primary Examiner* — Alan Chen
*Assistant Examiner* — Dave Misir
(74) *Attorney, Agent, or Firm* — Jay R. Anderson, Esq.; Ryan A. Schneider, Esq.; Troutman Sanders LLP

(57) ABSTRACT

Various embodiments of the invention are neural network adaptive control systems and methods configured to concurrently consider both recorded and current data, so that persistent excitation is not required. A neural network adaptive control system of the present invention can specifically select and record data that has as many linearly independent elements as the dimension of the basis of the uncertainty. Using this recorded data along with current data, the neural network adaptive control system can guarantee global exponential parameter convergence in adaptive parameter estimation problems. Other embodiments of the neural network adaptive control system are also disclosed.

19 Claims, 27 Drawing Sheets
(13 of 27 Drawing Sheet(s) Filed in Color)

OTHER PUBLICATIONS

Kosmatopoulos E. et al., Neural Network Control of Unknown Nonlinear Systems with Efficient Transient Performance, 19th ICANN, Sep. 14-17, 2009, pp. 638-647, Limassol, Cyprus.*

Chowdhary G., Johnson E., Theory and Flight Test Validation of Long Term Learning Adaptive Flight Controller, AIAA GNC, Aug. 18-21, 2008, Honolulu, Hawaii.*

Chowdhary G., Johnson E., Adaptive Neural Network Flight Control using both Current and Recorded Data, AIAA GNC, Aug. 20-23, 2007, Hilton Head Island, SC.*

Er Meng Joo et al., Face recognition With Radial Basis Function (RBF) Neural Networks, IEEE Transactions on Neural Networks, vol. 13, No. 3, pp. 697-710, May 2002.*

* cited by examiner

SYSTEMS AND METHODS FOR TRAINING NEURAL NETWORKS BASED ON CONCURRENT USE OF CURRENT AND RECORDED DATA

CROSS-REFERENCE TO RELATED APPLICATIONS

This application claims a benefit, under 35 U.S.C. §119(e), of U.S. Provisional Application Ser. No. 61/229,079, filed 28 Jul. 2009, the entire contents and substance of which are hereby incorporated by reference.

GOVERNMENT LICENSE RIGHTS

This invention was made with Government support under Agreement/Contract Number ECS-0238993, awarded by National Science Foundation. The Government has certain rights in the invention.

TECHNICAL FIELD

Various embodiments of the present invention relate to neural networks and, more particularly, to systems and methods for training neural networks based on current and recorded data.

BACKGROUND

Adaptive control has been widely studied for control of nonlinear plants with modeling uncertainties. Wide ranging applications of adaptive control can be found, including control of robotics arms, flight vehicle control, and control of medical processes. Many of these approaches rely on the popular Model Reference Adaptive Control (MRAC) architecture which guarantees that the controlled states track the output of an appropriately chosen reference model. Most MRAC methods achieve this tracking by using a parameterized model of the uncertainty, often referred to as the adaptive element and its parameters referred to as adaptive weights. In MRAC, the adaptive law is designed to update the parameters in the direction of maximum reduction of the instantaneous tracking error cost (e.g., $v(t)=e^T(t)e(t)$). While this approach ensures that the parameters take on values such that the uncertainty is instantaneously suppressed, this approach does not guarantee the convergence of the parameters to their ideal values unless the system states are persistently exciting (PE), meaning that the system states persistently receive new data.

It has been shown that the condition on PE system states can be related to a PE reference input by noting the following: If an exogenous reference input $t(t)$ contains as many spectral lines as the number of unknown parameters, then the system states are PE, and the parameter error converges exponentially to 0. However, this condition on persistent excitation of the reference input is restrictive and often infeasible to monitor online, i.e., in real time. For example and not limitation, in flight control applications, PE reference inputs may cause nuisance, waste fuel, and cause undue stress on the aircraft. Furthermore, since the exogenous reference inputs for many online applications are event based and not known a-priori, it is often impossible to monitor online whether a signal is PE. Consequently, parameter convergence is often not guaranteed in practice for many adaptive control applications.

Various methods have been developed to guarantee robustness and efficient uncertainty suppression in adaptive control without PE reference inputs. These methods, however, are not concerned with weight convergence, but rather with instantaneously suppressing the uncertainty.

SUMMARY

There is a need for neural network adaptive control systems and methods that can robustly and efficiently suppress uncertainty in adaptive control without persistent excitation, while enabling weight convergence. Various embodiments of the present invention can be directed toward such systems and methods.

Embodiments of the present invention can guarantee tracking error convergence and weight convergence in adaptive control without PE reference input. The presented method, termed as concurrent learning, uses recorded and current data concurrently for adaption in the framework of MRAC, and renders all system signals uniformly ultimately bounded. The concurrent use of past and current data is motivated by an argument that if the recorded data is made sufficiently rich, perhaps by recording when the system states were exciting for a short period, and used concurrently for adaptation, then weight convergence can occur without the system states being persistently exciting. According to an exemplary embodiment of the present neural network adaptive control system, if stored data has as many linearly independent elements as the dimension of the basis of the linearly parameterized uncertainty, then exponential tracking error and parameter convergence can be achieved through the concurrent use of current and previously recorded data, according to some embodiments of the present invention.

The above condition, that stored data has as many linearly independent elements as the dimension of the basis of the linearly parameterized uncertainty, can relate the convergence of weights to the spectral properties of the stored data. This condition is much less restrictive and more conducive to online monitoring than are conditions for achieving this end in other, conventional Model Reference Adaptive Controllers using neural networks.

These and other objects, features, and advantages of the neural network adaptive control system will become more apparent upon reading the following specification in conjunction with the accompanying drawing figures.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
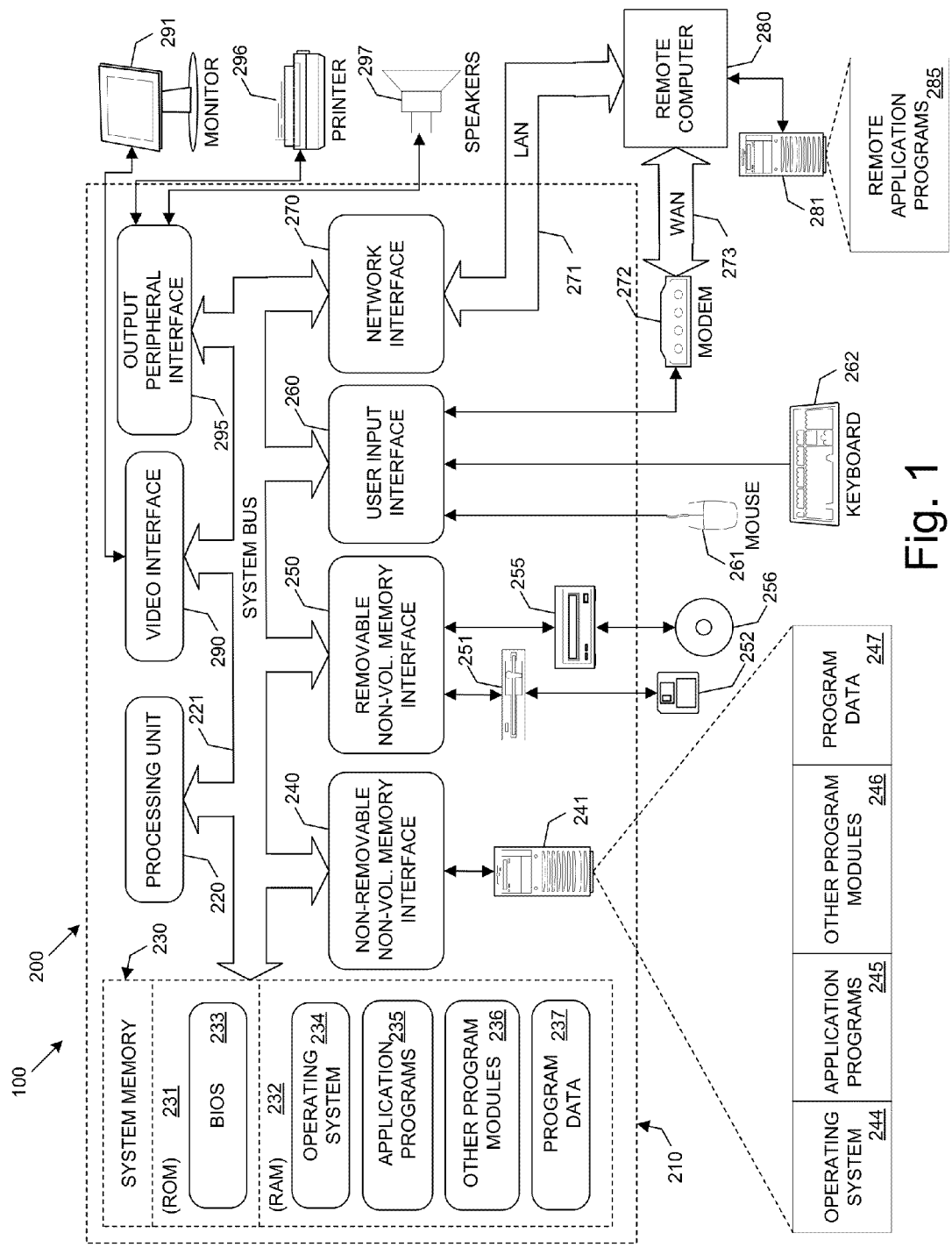
FIG. 1 illustrates an exemplary computing device useable in a neural network adaptive control system, according to an exemplary embodiment of the present invention.

To facilitate an understanding of the principles and features of the invention, various illustrative embodiments are explained below. In particular, the invention is described in the context of being a neural network adaptive control system that uses both recorded and current data concurrently to provide adaptive flight control. Embodiments of the invention, however, are not limited to flight control, but a neural network adaptive control system according to some embodiments of the invention can be used for other applications as well.

The components described hereinafter as making up various elements of the invention are intended to be illustrative and not restrictive. Many suitable components that would perform the same or similar functions as the components described herein are intended to be embraced within the scope of the invention. Other components not described herein can include, but are not limited to, for example, analogous components developed after development of the invention.

Various embodiments of the present invention are neural network adaptive control systems using concurrent learning. Embodiments of the invention provide a single hidden layer (SHL) neural network (NN) training law that uses both current and recorded data concurrently to incorporate long term learning and semi-global error parameterization. This learning and training paradigm is henceforth referred to as "Concurrent Learning". One possible use of a concurrent learning neural network is as an adaptive element in an approximate model inversion adaptive control system, such as an adaptive flight controller. The neural network can be trained on data available at the current time step (online training) as well as selected recorded data points (background training). A training law for a neural network can be a recursive mathematical law that uses available information to determine neural network weights, such that the error between the neural network output and the unknown model error is reduced. Exemplary combined online and background training law of the present invention can be formulated by adding the orthogonal projection of the neural network training law for stored data points in the null space of the current training law. Using the combined online and concurrent learning law the neural network can be made to adapt to multiple regions in a state space defined over multiple recorded data points. In this way, the neural network can be made to demonstrate long term learning capabilities and memory. The concept and theory of using orthogonal projections for the training of neural networks using both current and stored data in order to incorporate semi-global error parameterization is a unique contribution of this invention.

Referring now to the figures, in which like reference numerals represent like parts throughout the views, embodiments of the neural network adaptive control systems and methods will be described in detail.

According to an exemplary embodiment of the present invention, a neural network adaptive control system or method can be embodied in a computer-readable medium and executed by a computer processor on a computing device to provide one, some, or all aspects of the invention. FIG. 1 illustrates an exemplary computing device 200 in which the neural network adaptive control system 100 can be integrated, according to an exemplary embodiment of the present invention. Although specific components of the computing device 200 are illustrated in FIG. 1, the depiction of these components in lieu of others does not limit the scope of the invention. Rather, various types of computing devices can be used to implement embodiments of the neural network adaptive control system 100. Exemplary embodiments of the neural network system 100 can be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded computer systems, distributed computing environments that include any of the above systems or devices, and the like.

With reference to FIG. 1, components of the computing device 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 can include a variety of computer readable media. Computer-readable media can be any available media that can be accessed by the computing device 200, including both volatile and nonvolatile, removable and non-removable media. For example, and not limitation, computer-readable media can comprise computer storage media and communication media. Computer storage media includes both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store data accessible by the computing device 200.

Communication media can typically contain computer-readable instructions, data structures, program modules or other data in a modulated data signal such as a carrier wave or other transport mechanism and includes any information delivery media. For example, and not limitation, communication media can include wired media such as a wired network or direct-wired connection, and wireless media such as acoustic, RF, infrared and other wireless media. Combinations of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computing device 200, such as during start-up, can typically be stored in the ROM 231. The RAM 232 typically contains data and/or program modules that are immediately accessible to and/or presently in operation by the processing unit 220. For example, and not limitation, FIG. 1 illustrates an operating system 234, application programs 235, other program modules 236, and program data 237.

The computing device 200 can also include other removable/non-removable, volatile/nonvolatile computer storage media. By way of example only, FIG. 1 illustrates a hard disk drive 241 that can read from or write to non-removable, nonvolatile magnetic media, a magnetic disk drive 251 for reading or writing to a nonvolatile magnetic disk 252, and an optical disk drive 255 for reading or writing to a nonvolatile optical disk 256, such as a CD ROM or other optical media. Other removable/non-removable, volatile/nonvolatile computer storage media that can be used in the exemplary operating environment can include magnetic tape cassettes, flash memory cards, digital versatile disks, digital video tape, solid state RAM, solid state ROM, and the like. The hard disk drive 241 can be connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 1 can provide storage of computer readable instructions, data structures, program modules, and other data for the computing device 200. For example, hard disk drive 241 is illustrated as storing an operating system 244, application programs 245, other program modules 246, and program data 247. These components can either be the same as or different from operating system 234, application programs 235, other program modules 236, and program data 237.

A web browser application program 235, or web client, can be stored on the hard disk drive 241 or other storage media. The web client can comprise an application program 235 for requesting and rendering web pages, such as those created in Hypertext Markup Language ("HTML") or other markup languages. The web client can be capable of executing client side objects, as well as scripts through the use of a scripting host. The scripting host executes program code expressed as scripts within the browser environment. Additionally, the web client can execute web application programs 235, which can be embodied in web pages.

A user of the computing device 200 can enter commands and information into the computing device 200 through input devices such as a keyboard 262 and pointing device 261, commonly referred to as a mouse, trackball, or touch pad. Other input devices (not shown) can include a microphone, joystick, game pad, satellite dish, scanner, electronic white board, or the like. These and other input devices are often connected to the processing unit 220 through a user input interface 260 coupled to the system bus 221, but can be connected by other interface and bus structures, such as a parallel port, game port, or a universal serial bus (USB). A monitor 291 or other type of display device can also be connected to the system bus 221 via an interface, such as a video interface 290. In addition to the monitor, the computing device 200 can also include other peripheral output devices such as speakers 297 and a printer 296. These can be connected through an output peripheral interface 295.

The computing device 200 can operate in a networked environment using logical connections to one or more remote computers, such as a remote computer 280. The remote computer 280 can be a personal computer, a server, a router, a network PC, a peer device, or other common network node, and can include many or all of the elements described above relative to the computing device 200, including a memory storage device 281. The logical connections depicted in FIG. 1 include a local area network (LAN) 271 and a wide area network (WAN) 273, but can also include other networks.

When used in a LAN networking environment, the computing device 200 can be connected to the LAN 271 through a network interface or adapter 270. When used in a WAN networking environment, the computing device 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computing device 200 can be stored in the remote memory storage device. For example, and not limitation, FIG. 1 illustrates remote application programs 285 as residing on memory device 281. It will be appreciated that the network connections shown are exemplary and other means of establishing a communications link between the computers can be used.

As embodied in one or more computing devices 200, such as the computing device 200 of FIG. 1, various exemplary embodiments of the neural network adaptive control system 100 can guarantee tracking error convergence and weight convergence in adaptive control without persistency of excitation. The neural network adaptive control system 100 can use recorded and current data concurrently for adaption in the framework of MRAC, and can thus render all system signals uniformly ultimately bounded. The concurrent use of past and current data is motivated by the argument that if the recorded data is made sufficiently rich, perhaps by recording when the system states were exciting for a short period, and used concurrently for adaptation, then weight convergence can occur without the system states being persistently excited. The neural network adaptive control system 100 can apply this argument to achieve exponential tracking error and parameter convergence, if the stored data has as many linearly independent elements as the dimension of the basis of the linearly parameterized uncertainty. This is a unique feature of embodiments of the neural network adaptive control system 100.

The above condition, i.e., the stored data has as many linearly independent elements as the dimension of the basis of the linearly parameterized uncertainty, relates the convergence of weights to the spectral properties of the stored data. This condition, however, is less restrictive than conditions required by previous neural networks, and is thus conducive to online monitoring. To illustrate various embodiments of the neural network adaptive control system 100, first, the problem of adaptive parameter estimation using concurrent learning is addressed, and it is shown that exponential parameter convergence can be guaranteed subject to the condition mentioned above. Then, the problem of adaptive control using concurrent learning is addressed, and it is shown that exponential tracking of reference model and parameter convergence can be guaranteed subject to the same condition.

I. Adaptive Parameter Estimation Without Persistency of Excitation

Adaptive parameter estimation is generally concerned with using measured output and regressor vectors to form an estimate of unknown system dynamics online. We shall assume that the unknown system dynamics are linearly parameterized; that is, suppose $y: \Re^m \to \Re$ denotes the output of an unknown model whose regressor vectors $\Phi(x(t)) \in \Re^m$ are known, bounded, and continuously differentiable, and whose unknown parameters are contained in the constant ideal weight vector $W^* \in \Re^m$. In that case, the unknown system dynamics can be given by:

$$y(t) = W^{*T} \Phi(x(t)) \quad (1)$$

Let $W(t) \in \Re^m$ denote an online estimate of the ideal weights $W^*$; since for a given x the mapping $\Phi(x)$ is known, according to an exemplary embodiment of the present invention. Then, an online estimate of y can be given by the mapping $v: \Re^m \to \Re$ the following form:

$$v(t) = W^T(t) \Phi(x(t)) \quad (2)$$

This can result in an approximation error of $\epsilon(t) = v(t) - y(t)$, which can be represented as:

$$\epsilon(t) = (W - W^*)^T(t) \Phi(x(t)) \quad (3)$$

Letting $\tilde{W}(t) = W(t) - W^*$, we have:

$$\epsilon(t) = \tilde{W}^T(t) \Phi(x(t)) \quad (4)$$

In the above form, it can be seen that $\epsilon(t) \to 0$ as $t \to \infty$ if the parameter error $\tilde{W} \to 0$ as $t \to \infty$. Therefore, embodiments of the present invention seek to implement an adaptive law. W(t) that uses the measurements of (x)t and (y)t, along with knowledge of the mapping $\Phi(x)$, to ensure that $W(t) \to W^*$. For the purposes of some exemplary embodiments of the neural network adaptive conrol system 100, it is assumed that the full state (x)t is available for measurement. A well-known choice for W(t) is the following gradient-based adaptive law, which can update the adaptive weight in the direction of maximum reduction of the instantaneous quadratic cost $V = \epsilon^T(t) \epsilon(t)$, where $\Gamma$ represents the learning rate:

$$\dot{W}(t) = -\Gamma \Phi x(t) \epsilon(t) \quad (5)$$

When using this adaptive law, it is the case that $W(t) \to W^*$ if and only if the vector signal $\Phi(x(t))$ is persistently exciting. Various equivalent definitions of excitation and the persistence of excitation of a bounded vector signal exist. For the purposes of some exemplary embodiments of the neural network adaptive control system 100, the following definitions can be used:

Definition 1: A bounded vector signal $\Phi(t)$ is exciting over an interval $[t, t+T]$, $T > 0$ and $t \geq t_0$ if there exists $\gamma > 0$ such that, where I is the appropriate identity matrix:

$$\int_t^{t+T} \Phi(\tau) \Phi^T(\tau) d\tau \geq \gamma I \quad (6)$$

Definition 2: A bounded vector signal $\Phi(t)$ is persistently exciting if for all $t > t_0$ there exists $T > 0$ and $\gamma > 0$ such that, where I is the appropriate identity matrix:

$$\int_t^{t+T} \Phi(\tau) \Phi^T(\tau) d\tau \geq \gamma I \quad (7)$$

As an example, consider that in the two dimensional case, vector signals containing a step in every component are exciting, but not persistently exciting; whereas the vector signal $\Phi(t) = [\sin(t), \cos(t)]$ is persistently exciting.

A major drawback of the conventional condition on persistent excitation of $\Phi(t)$ is that persistent excitation requires a persistent control effort for enforcement, and it is often infeasible to monitor online whether a signal is persistently exciting. On examining Equation 5, its can be seen that the adaptive law uses only instantaneously available information $(x(t), \epsilon(t))$ for adaptation. According to an exemplary neural network adaptive control system 100 of the present invention, however, if the adaptive law uses specifically selected, recorded data concurrently with current data for adaptation, and if the recorded data is sufficiently rich, then it can be possible to guarantee parameter convergence without requiring persistently (exciting $\Phi(t)$. Thus, the neural network adaptive control system 100 can improve upon conventional neural networks by eliminating the requirement of persistent excitation.

The neural network adaptive control system can utilize a concurrent learning algorithm for adaptive parameter identification, guaranteeing exponential parameter convergence subject to an easily monitored condition on linear independence of the stored data. Let $j \in [1, 2, \ldots p]$ denote the index of a stored data point $x_j$, let $\Phi(x_j)$ denote the regressor vector evaluated at point $x_j$, let $\epsilon_j = \tilde{W}^T \Phi(x_j)$, and let $\Gamma > 0$ denote a positive definite learning rate matrix. Then the concurrent learning gradient descent algorithm is given by $$\dot{W}(t) = -\Gamma \Phi(x(t)) \epsilon(t) - \sum_{j=1}^{p} \Gamma \Phi(x_j) \epsilon_j \qquad (8)$$

Without loss of generality, let $\Gamma = I$. Then, the parameter error dynamics for the concurrent learning gradient descent algorithm can be found by differentiating $\tilde{W}$ and using Equation 8:

$$\begin{aligned}\dot{\tilde{W}}(t) &= -\Phi(x(t))\epsilon(t) - \sum_{j=1}^{p} \Phi(x_j) \epsilon_j \\ &= -\Phi(x(t))\Phi^T(x(t))\tilde{W}(t) - \sum_{j=1}^{p} \Phi(x_j)\Phi^T(x_j)\tilde{W}(t) \\ &= -\left[\Phi(x(t))\Phi^T(x(t)) + \sum_{j=1}^{p} \Phi(x_j)\Phi^T(x_j)\right]\tilde{W}(t)\end{aligned} \qquad (9)$$

This is a linear time varying equation in $\tilde{W}$.

The following can be a condition on the linear independence of the stored data that is required to guarantee convergence:

Condition 1: The recorded data has as many linearly independent elements as the dimension of $\Phi(x(t))$. That is, where p is the number of stored data points and m is the dimension of the input, if $Z = [\Phi(x_1), \ldots, \Phi(x_p)]$, then rank(Z)=m.

This condition requires that the stored data contain sufficiently different elements to form a basis for the linearly parameterized uncertainty. This condition differs from the condition on conventional, persistently exciting $\Phi(t)$ in the following ways: (1) This condition can apply only to recorded data, whereas persistency of excitation can apply also to how $\Phi(t)$ should behave in the future. (2) This condition can apply only to a subset of the set of all past data. Specifically, it can apply only to data that has been specifically selected and recorded. (3) Because it can be fairly straight forward to determine the rank of a matrix online, this condition can be conducive to online monitoring. (4) It can always be possible to record data such that Condition 1 is met when the system states are exciting over a finite time interval. (5) It can also be possible to meet this condition by selecting and recording data during a normal course of operation over a long period without requiring persistence of excitation.

The following theorem shows that once Condition 1 on the recorded data is met, then the concurrent learning gradient descent law of Equation 8 can guarantee exponential parameter convergence.

Theorem 1: If the stored data points satisfy Condition 1, then $\hat{W}$ is globally exponentially stable when using the concurrent learning gradient descent weight adaptation law of Equation 8.

Proof: Let $V(\tilde{W}) = \frac{1}{2} \tilde{W}(t)^T \tilde{W}(t)$ be a Lyapunov candidate. Since $V(\tilde{W})$ is quadratic, there exists an $\alpha > 0$ and a $\beta > 0$ such that $\alpha \|\tilde{W}\|^2 \leq V(\tilde{W}) \leq \beta \|\tilde{W}\|^2$. Differentiating with respect to time along the trajectories of Equation 9 gives $$\dot{V}(\tilde{W}) = -\tilde{W}(t)^T \left[\Phi(x(t))\Phi^T(x(t)) + \sum_{j=1}^{p} \Phi(x_j)\Phi^T(x_j)\right] \tilde{W}(t) \qquad (10)$$

Let $$\Omega(t) = \Phi(x(t))\Phi^T(x(t)) + \sum_{j=1}^{p} \Phi(x_j)\Phi^T(x_j).$$

and note that $$P = \sum_{j=1}^{p} \Phi(x_j)\Phi^T(x_j) > 0$$

due to Condition 1. Hence, $\Omega(t) > 0$ for all t. Furthermore, since $\Phi(x(t))$ is assumed to be continuously differentiable, there exists a $\lambda_m > 0$ such that $$\dot{V}(\tilde{W}) \leq -\lambda_m \tilde{W}(t)^T \tilde{W}(t) \leq -\lambda_m \|\tilde{W}\|^2 \qquad (11)$$

Hence, using Lyapunov's theorem, which is reproduced in Haddad and Chellaboina's Theorem 4.6 (Wassim M. Haddad and VijaySekhar Chellaboina. *Nonlinear Dynamical Systems and Control: A Lyapunov-Based Approach*. Princeton University Press, Princeton, 2008), the expotential stability of the zero solution $\tilde{W} \equiv 0$ of the parameter error dynamics of Equation 9 can be established. Furthermore, since the Lyapunov candidate is radially unbounded, the result can be global.

Remark 1: The above proof shows exponential convergence of parameter estimation error without requiring persistency of excitation in the signal $\Phi(x(t))$. The proof requires that $$\sum_{j=1}^{p} \Phi(x_j)\Phi^T(x_j)$$

be positive definite, which can be guaranteed if Condition 1 is satisfied.

II. Adaptive Control Without Persistency of Excitation

Following, the problem of tracking error and parameter error convergence in the framework of Model Reference Adaptive Control (MRAC) is considered, and it is shown that a concurrent learning algorithm of the neural network adaptive control system 100 can guarantee exponential convergence of parameter error subject to Condition 1 and without requiring PE reference input.

A. Model Reference Adaptive Control

This section discusses the formulation of MRAC. Let $x(t) \in \Re^n$ be the known state vector, let $u \in \Re$ denote the control input, and consider the following system, in which each of A and B is a state matrix for a linear system:

$$\dot{x} = Ax(t) + B(u)(t) + \Delta(x(t)) \qquad (12)$$

where $A \in \Re^{n \times n}$, $B \in \Re^n$, and $\Delta(x)$ is a continuously differentiable function representing the scalar uncertainty. We assume that the system in 12 is controllable.

A reference model can be designed that characterizes the desired response of the system:

$$\dot{x}_{rm} = A_{rm} x_{rm}(t) + B_{rm} r(t) \qquad (13)$$

where $A_{rm} \in \Re^{n \times n}$ is a Hurwitz matrix and r(t) denotes a bounded reference signal. A tracking control law consisting of a linear feedback part $u_{pd}=K(x_{rm}(t)-x(t))$, a linear feedforward part $u_{erm}=K_r[x_{rm}^T,r(t)^T]$, and an adaptive part $u_{ad}(x)$ is proposed to have the following form:

$$u=u_{erm}+u_{pd}-u_{ad} \quad (14)$$

When the tracking error e is defined as $e(t)=x_{rm}(t)-x(t)$, with an appropriate choice of $u_{erm}$ such that $Bu_{erm}=(A_{rm}-A)x_{rm}+B_{rm}r(t)$, the tracking error dynamics can be found to have the form:

$$\dot{e}=A_m e+B(u_{ad}(x)-\Delta(x)) \quad (15)$$

where the baseline full state feedback controller $u_{pd}=Kx$ is assumed to be designed such that $A_m=A-BK$ is a Hurwitz matrix. Hence for any positive definite matri $Q \in \Re^{n \times n}$, a positive definite solution $P \in \Re^{n \times n}$ exists to the Lyapunov equation:

$$A_m^T P+PA_m+Q=0 \quad (16)$$

The following are assumed:

Assumption 1: For simplicity, assume that $B=[0,0,\ldots,1]^T$ and $\Delta(x) \in \Re$. This simplification does not limit application of the neural network.

Assumption 2: The uncertainty $\Delta(x)$ can be linearly parameterized. That is, there exists a vector of constants $W=[w_1, w_2, \ldots, w_m]^T$ and a vector of continuously differentiable functions $\Phi(x)=[\phi_1(x),\phi_2(x),\ldots,\phi_m(x)]^T$ such that $$\Delta(x)=W^{*T}\Phi(x) \quad (17)$$

Case 1, Structured Uncertainty: Consider the case where the form of the linearly parameterized uncertainty is known, that is the mapping $\Phi(x)$ is known. In this case letting W denote the estimate $W^*$ the adaptive law can be written as $$u_{ad}(x)=W^T \Phi(x) \quad (18)$$

For this case, the following adaptive law can apply:

$$\dot{W}=-\Gamma_W \Phi(x(t))e^T PB \quad (19)$$

where $\Gamma_W$ is a positive definite learning rate matrix results in $e(t) \to 0$. However, Equation 19 does not guarantee the convergence (or even the boundedness) of W. Equation 19 will be referred to as the baseline adaptive law. For the baseline adaptive law, it is well known that a necessary and sufficient condition for conventionally guaranteeing that $W(t) \to W$ is that $\Phi(t)$ be persistently exciting. Furthermore, it has been shown that $\Phi(t)$ can be made persistently exciting if the exogenous reference input has as many spectral lines as the unknown parameters.

Case 2, Unstructured Uncertainty: In the more general case where it is only known that the uncertainty $\Delta(x)$ is continuous and defined over a compact domain, the adaptive part of the control law can be represented using a Radial Basis Function (RBF) neural network:

$$u_{ad}(x)=\tilde{W}^T \sigma(x) \quad (20)$$

where $\tilde{W} \in \Re$ and $\sigma=[1,\sigma_2(x),\sigma_3(x),\ldots,\sigma_l(x)]^T$ is a vector of known radial basis functions. For $i=[2,3,\ldots,l]$, where l refers to the number of radial basis functions, let $c_i$ denote the RBF centroid and $\mu_i$ denote the RBF width then for each i, the radial basis functions are given as:

$$\sigma_i(x)=e^{-\|x-c_i\|^2/\mu_i} \quad (21)$$

Appealing to the universal approximation property of RBF neural networks, given a fixed number of radial basis functions l there exist ideal weights $W^* \in \Re^l$ and a real number $\bar{\epsilon}$, such that $$\Delta(x)=W^{*T}\sigma(x)+\tilde{\epsilon}, \quad (22)$$

where $\tilde{\epsilon}$ can be made arbitrarily small given sufficient number of radial basis functions.

B. Proof of Stability

In this section, two key theorems are presented to guarantee global tracking error and parameter error convergence to 0, when using the concurrent learning adaptive control method in the framework of MRAC. The first theorem shows that global exponential stability of the tracking error dynamics (Equation 15) and exponential convergence of the adaptive weights W to their ideal values $W^*$ is guaranteed if $W_c(t)=I$ and Condition 1 is satisfied, where $W_c(t)$ is an orthogonal projection matrix that restricts the update of the weights based on the stored data to the nullspace of the direction of the weight update, based on the instantaneous (current) data point. The second theorem considers the case when $W_c(t)$ restricts adaptation on recorded data to the null space of the adaptation on current data. However, embodiments of the neural network adaptive control system 100 need not be limited to those in which the adaptation on recorded data are restricted to the null space of the adaptation on current data. The second theorem also shows that global asymptotic stability of the tracking error dynamics and asymptotic convergence of the adaptive weights W to their ideal values $W^*$ is guaranteed, subject to Condition 1.

Theorem 2: Consider the system in Equation 12, the control law of Equation 14, the case of structured uncertainty (Case 1), and the following weight update law:

$$\dot{W} = -\Gamma w \Phi(x(t))e^T PB - \sum_{j=1}^{p} \Gamma w \Phi(x_j) \epsilon_j \quad (23)$$

Additionally, assume that the stored data points satisfy Condition 1. Then the zero solution $e(t)=0$ of tracking error dynamics of Equation 15 is globally exponentially stable, and $W(t) \to W^*$ exponentially.

Proof: Consider the following positive definite and radially unbounded Lyapunov candidate:

$$V(e, \tilde{W}) = \frac{1}{2}e^T Pe + \frac{1}{2}\tilde{W}^T \Gamma w^{-1} \tilde{W} \quad (24)$$

Let $\xi=[e,\tilde{W}]$, and let $\lambda_{min}$ and $\lambda_{min}$ denote operators that return the smallest and the largest eigenvalue of a matrix, then we have $$\frac{1}{2}\min(\lambda_{min}(P), \lambda_{min}(\Gamma_w^{-1}))\|\xi\|^2 \leq V(e, \tilde{W}) \leq \frac{1}{2}\min(\lambda_{max}(P), \lambda_{max}(\Gamma_w^{-1}))\|\xi\|^2$$

Differentiating 24 along the trajectory of 15, the Lyapunov equation (Equation 16), and noting that $$\dot{\tilde{W}} = -\sum_{j=1}^{p} \Phi(x_j)\Phi^T(x_j)\tilde{W}(t) - \Gamma_W \Phi(x(t))e^T PB,$$

we have:

$$\dot{V}(e, \tilde{W}) = -\frac{1}{2}e^T Qe + e^T PB(u_{ad} - \Delta) + \tilde{W}^T\left(-\sum_{j=1}^{p} \Phi(x_j)\Phi^T(x_j)\tilde{W}(t) - \Gamma_W \Phi(x(t))e^T PB\right) \quad (25)$$

Canceling like terms and simplifying, we have $$\dot{V}(e, \tilde{W}) = -\frac{1}{2}e^T Qe - \tilde{W}^T\left(\sum_{j=1}^{p} \Phi(x_j)\Phi^T(x_j)\right)\tilde{W}(t) \quad (26)$$

Let $$\Omega = \sum_{j=1}^{p} \Phi(x_j)\Phi^T(x_j).$$

Then, due to Condition 1, $\Omega > 0$, and $$\dot{V}(e, \tilde{W}) \leq -\frac{1}{2}\lambda_{min}(Q)e^T e - \lambda_{min}(\Omega)\tilde{W}^T \tilde{W}(t) \quad (27)$$

Hence:

$$\dot{V}(e, \tilde{W}) \leq -\frac{\max(\lambda_{min}(Q), 2\lambda_{min}(\Omega))}{\min(\lambda_{min}(P), \lambda_{min}(\Gamma_W^{-1}))} V(e, \tilde{W}), \quad (28)$$

establishing the exponential stability of the zero solution $e \equiv 0$ and $\tilde{W} \equiv 0$ (using Lyapunov stability theory). Because $V(e, \tilde{W})$ is radially unbounded, the result can be global, and x tracks $x_{ref}$ exponentially, while $W(t) \to W^*$ exponentially as $t \to \infty$.

Remark 2: The above proof shows exponential convergence of tracking error $e(t)$ and parameter estimation error $\tilde{W}(t)$ to 0 without requiring persistency of excitation in the signal $\Phi(x(t))$. Condition 1 can be the only condition required, which can guarantee that the matrix $$\sum_{j=1}^{p} \Phi(x_j)\Phi^T(x_j)$$

is positive definite. This condition can be easily verified online and can be less restrictive than a condition on PE reference input.

Remark 3: The inclusion or removal of new data points in Equation 23 does not affect the Lyapunov candidate.

Remark 4: The rate of convergence can be determined by the spectral properties of Q, P, $\Gamma_W$, and $\Omega$. The first three can be dependent on the choice of the linear gains $K_p$ and the learning rates, and the last one can be dependent on the choice of the stored data.

Remark 5: The above proof can be specialized to the case where the uncertainty is unstructured (Case 2) by using an RBF neural network for approximating uncertainty. In this case, referring to Equation 22, it can be shown that the tracking error can remain uniformly ultimately bounded; while the adaptive weights can approach and remain bounded in a neighborhood of the ideal weights. Furthermore, in this case, the satisfaction of Condition 1 can be reduced to selecting distinct points for storage due to Micchelli's theorem.

Remark 6: For evaluating the adaptive law of Equation 23, the term $\epsilon_j = v(x_j) - \Delta(x_j)$ is required for the $j^{th}$ data point where $j \in [1, 2, \ldots p]$. The model error $\Delta(x_j)$ can be observed by appealing to Assumption 1 and noting that:

$$\Delta(x_j) = B^T[\dot{x}_j - Ax_j - Bu_j] \quad (29)$$

Since A, B, $x_j$, and $u_j$ are known, the problem of estimating system uncertainty can be reduced to that of estimation of by using Equation 29. In cases where an explicit measurement for $\dot{x}$ is not available, $\dot{x}_j$ can be estimated using an implementation of a fixed point smoother.

In Theorem 2, the adaptive law does not prioritize weight updates based on the instantaneous tracking error over the weight updates based on stored data. However, prioritization can be achieved by enforcing separation in the training law by restricting the weight updates based on past data to the null space of the weight updates based on current data. To achieve this, we let $W_t(t) = \Phi(x(t))eTPB$, and we use the following projection operator:

$$W_c(t) = \begin{cases} I - \dot{W}_t(\dot{W}_t(t)^T \dot{W}_t(t))^{-1}\dot{W}_t(t)^T & \text{if } \dot{W}_t(t) \neq 0 \\ I & \text{if } \dot{W}_t(t) = 0 \end{cases} \quad (30)$$

For this case, the following theorem can ascertain that global asymptotic stability of the tracking error dynamics and asymptotic convergence of the parameter error to 0 can be guaranteed subject to Condition 1.

Theorem 3: Consider the system in Equation 12, the control law of Equation 14, and above the definition of $W_c(t)$. For each t, let $N_{101}$ be the set containing all $\Phi(x_j) \perp \dot{W}_t(t)$. That is, $N_\Phi = \{\Phi(x_j): W_c(t)\Phi(x_j) = \Phi(x_j)\}$. Consider the following weight update law:

$$\dot{W} = -\Gamma_W \Phi(x(t))e^T PB - \Gamma_W W_c(t)\sum_{j \in N_\Phi} \Phi(x_j)\epsilon_j \quad (31)$$

Furthermore, assume that the stored data points $\Phi(x_j)$ satisfy Condition 1. Then the zero solution $\epsilon(t) = 0$ of tracking error dynamics of Equation 15 can be globally asymptotically stable and $W(t) \to W^*$.

Proof: Consider the following positive definite and radially unbounded Lyapunov candidate:

$$V(e, \tilde{W}) = \frac{1}{2}e^T Pe + \frac{1}{2}\tilde{W}^T \Gamma_W^{-1} \tilde{W} \quad (32)$$

Differentiating Equation 32 along the trajectory of Equation 15, taking the Lyapunov equation (Equation 16), and noting that $$\dot{\tilde{W}} = -\Gamma_W W_c(t) \sum_{j \in N_\Phi} \Phi(x_j) \Phi^T(x_j) \tilde{W}(t) - \Gamma_W \Phi(x(t)) e^T PB,$$

gives the following:

$$\dot{V}(e, \tilde{W}) = -\frac{1}{2} e^T Q e + e^T PB(u_{ad} - \Delta) + \tilde{W}^T \left( -W_c(t) \sum_{j \in N_\Phi} \Phi(x_j) \Phi^T(x_j) \tilde{W} - \Gamma_W \Phi(x(t)) e^T PB \right) \quad (33)$$

Canceling like terms and simplifying gives:

$$\dot{V}(e, \tilde{W}) = -\frac{1}{2} e^T Q e - \tilde{W}^T \left( W_c(t) \sum_{j \in N_\Phi} \Phi(x_j) \Phi^T(x_j) \right) \tilde{W} \quad (34)$$

Note that $\tilde{W} \in \Re^m$ can be written as $\tilde{W}(t) = (I - W_c(t)) \tilde{W}(t) + W_c(t) \tilde{W}(t)$, where $W_c$ is the orthogonal projection operator given in Equation 30. Additionally, $W_c^2(t) = W_c(t)$, and $I - W_c(t))W_c(t) = 0$. Hence $$\dot{V}(e, \tilde{W}) = -\frac{1}{2} e^T Q e - \tilde{W}^T W_c(t) \sum_{j \in N_\Phi}^{p} \Phi(x_j) \Phi^T(x_j) W_c(t) \tilde{W} - \tilde{W}^T W_c(t) \sum_{j \in N_\Phi}^{p} \Phi(x_j) \Phi^T(x_j) (I - W_c(t)) \tilde{W} \quad (35)$$

However, since the sum in the last term of $\dot{V}(e, \tilde{W})$ is only performed on the elements in $N_{101}$, we have that for all $j$, $\Phi(x_j) = W_c(t) \Phi(x)$. Therefore, it follows that $$\tilde{W}^T W_c(t) \sum_{j \in N_\Phi}^{p} W_c(t) \Phi(x_j) \Phi^T(x_j) W_c(t) (I - W_c(t)) \tilde{W}$$

equals 0, and hence:

$$\dot{V}(e, \tilde{W}) = -\frac{1}{2} e^T Q e - \tilde{W}^T W_c(t) \sum_{j \in N_\Phi}^{p} \Phi(x_j) \Phi^T(x_j) W_c(t) \tilde{W} \leq 0 \quad (36)$$

The above establishes Lyapunov stability of the zero solution $e \equiv 0$, $\tilde{W} \equiv 0$. To show asymptotic stability, one must show that $\dot{V}(e, \tilde{W}) = 0$ only when $e = 0$, and $\tilde{W} = 0$. Consider the case when $\dot{V}(e, \tilde{W}) = 0$. Because Q is positive definite, this means that $e \equiv 0$. Let $e \equiv 0$, and suppose ad absurdum there exists a $\tilde{W} \neq 0$ such that $\dot{V}(e, \tilde{W}) = 0$. Since $e \equiv 0$, it is the case that $\dot{W}_t = 0$. Hence, from the definition of Wc (Equation 30), Wc=I. Therefore, it follows that the set $N\Phi$ contains all the stored data points, and that $$\tilde{W}^T \sum_{j=0}^{p} \Phi(x_j) \Phi^T(x_j) \tilde{W} = 0.$$

However, since the stored data points satisfy Condition 1, $$\tilde{W}^T \sum_{j=1}^{p} \Phi(x_j) \Phi^T(x_j) \tilde{W} > 0$$

for all $\tilde{W} \neq 0$, thus contradicting the claim. Therefore, we have shown that $\dot{V}(e, \tilde{W}) = 0$ only when $e = 0$ and $\tilde{W} = 0$, thus establishing asymptotic stability of the zero solution $e = 0$ and $\tilde{W} \equiv 0$ and, further, guaranteeing that x tracks asymptotically and $W \to W^*$ as $t \to \infty$. Since the Lyapunov candidate can be radially unbounded, this result can be global.

Remark 7: The above proof shows asymptotic convergence of the tracking error e(t) and the parameter estimation error $\tilde{W}(t)$, without requiring persistency of excitation in the signal $\Phi(x(t))$. Condition 1 can be only required condition, which can guarantee that the matrix $$\sum_{j=1}^{p} \Phi(x_j) \Phi^T(x_j)$$

is positive definite. As noted previously, this can be true if Condition 1 is satisfied. Remarks 2 to 6 are also applicable to this theorem.

Remark 8: $\dot{V}(e, \tilde{W}) = 0$ will remain negative even when $N_{101}$ is empty at time t, if $e \neq 0$. If $e = 0$, $N_{101}$ cannot remain empty due to the definition of $W_c$.

Remark 9: If $e(t) = 0$ or $\Phi(x(t)) = 0$ and $\tilde{W}(t) \neq 0$, $$\dot{V}(e, \tilde{W}) = \tilde{W}^T \sum_{j=0}^{p} \Phi(x_j) \Phi^T(x_j) \tilde{W} < 0$$

due to Condition 1 and due to the definition of Wc(t) (Equation 30). This indicates that parameter convergence can occur even when the tracking error or system states are not persistently exciting.

Remark 10: For practical applications the following approximations can be used:
$N_{101} = \{\Phi(x_j) : \|W_c(t)\Phi(x_j) - \Phi(x_j)\| < \beta\}$, where $\beta$ is a small positive constant; and
$W_c(t) = I$ if $|e(t)| < \alpha$, where $\alpha$ is a small positive constant.

III. Numerical Simulations

In this section we present results of numerical simulations that support the developed theory.

A. Adaptive Parameter Estimation

Below, a simple two dimensional example is presented to illustrate the effect of Condition 1. Let t denote the time, and let dt denote a discrete time interval. Additionally, for each t+dt let $\Theta(t)$ take on incrementally increasing values from $-\pi$ continuing on to $2\pi$, with an increment step equal to dt. Let $y = W^T \Phi(\Theta)$ be the model of the uncertainty that is to be estimated online with $W = [0.1, 0.6]$ and $\Phi(\theta) = \lceil 1, e^{-|\theta - \pi/2|^2} \rceil$. We note that y is the output of a RBF neural network with a single hidden node.

Figure 2:
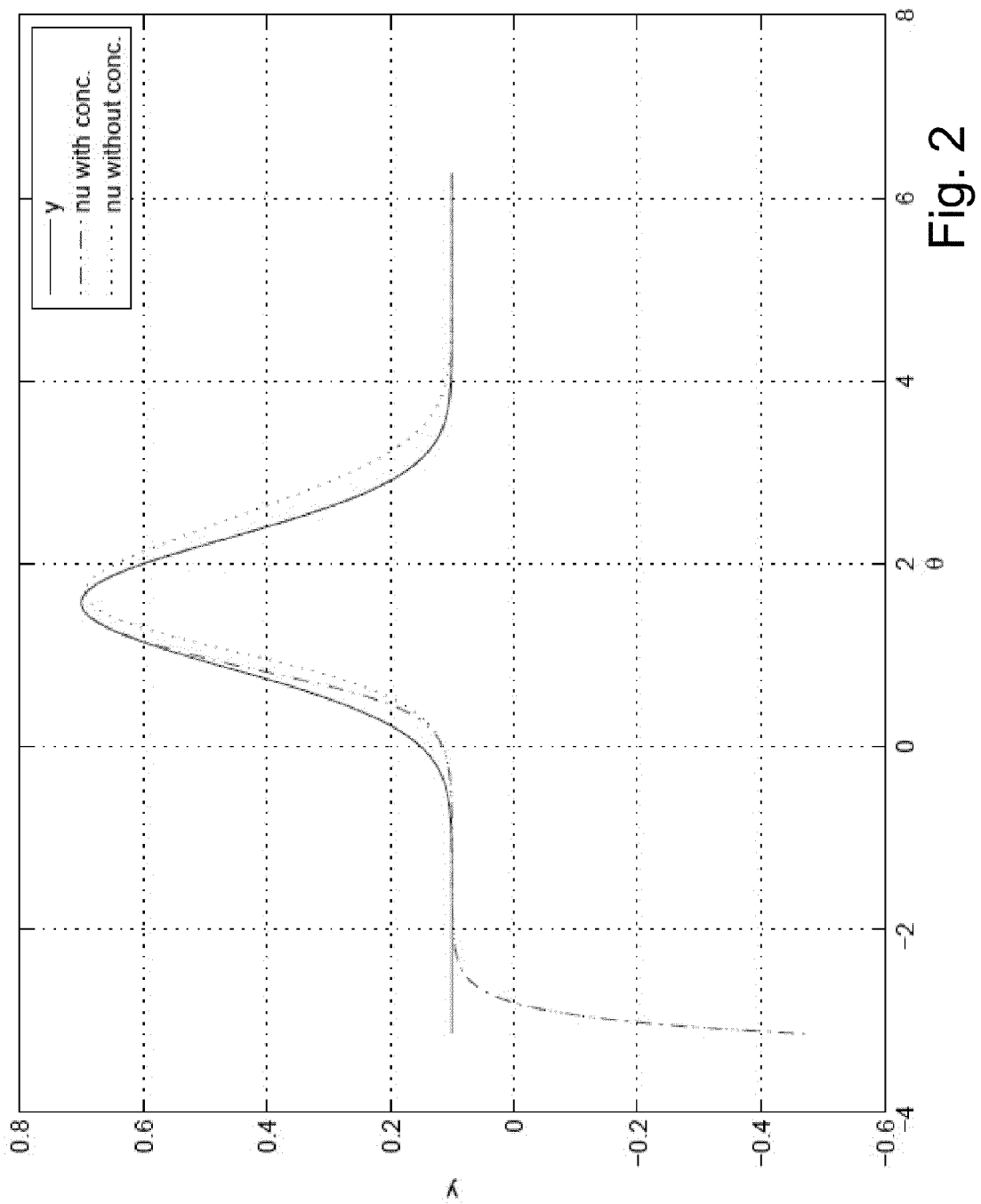
FIG. 2 is a graph illustrating online estimation performance of the neural network adaptive control system, as compared to model output, according to an exemplary embodiment of the present invention.

FIG. 2 compares the model output y with the estimate v for the concurrent learning parameter estimation algorithm of Theorem 1 and the baseline gradient descent algorithm of Equation 5. In FIG. 2, the output of the concurrent learning algorithm is shown by dashed and dotted lines, whereas the output of the baseline algorithm (without concurrent learning) is shown by dotted lines. The concurrent learning gradient descent algorithm outperforms the baseline gradient descent.

Figure 3:
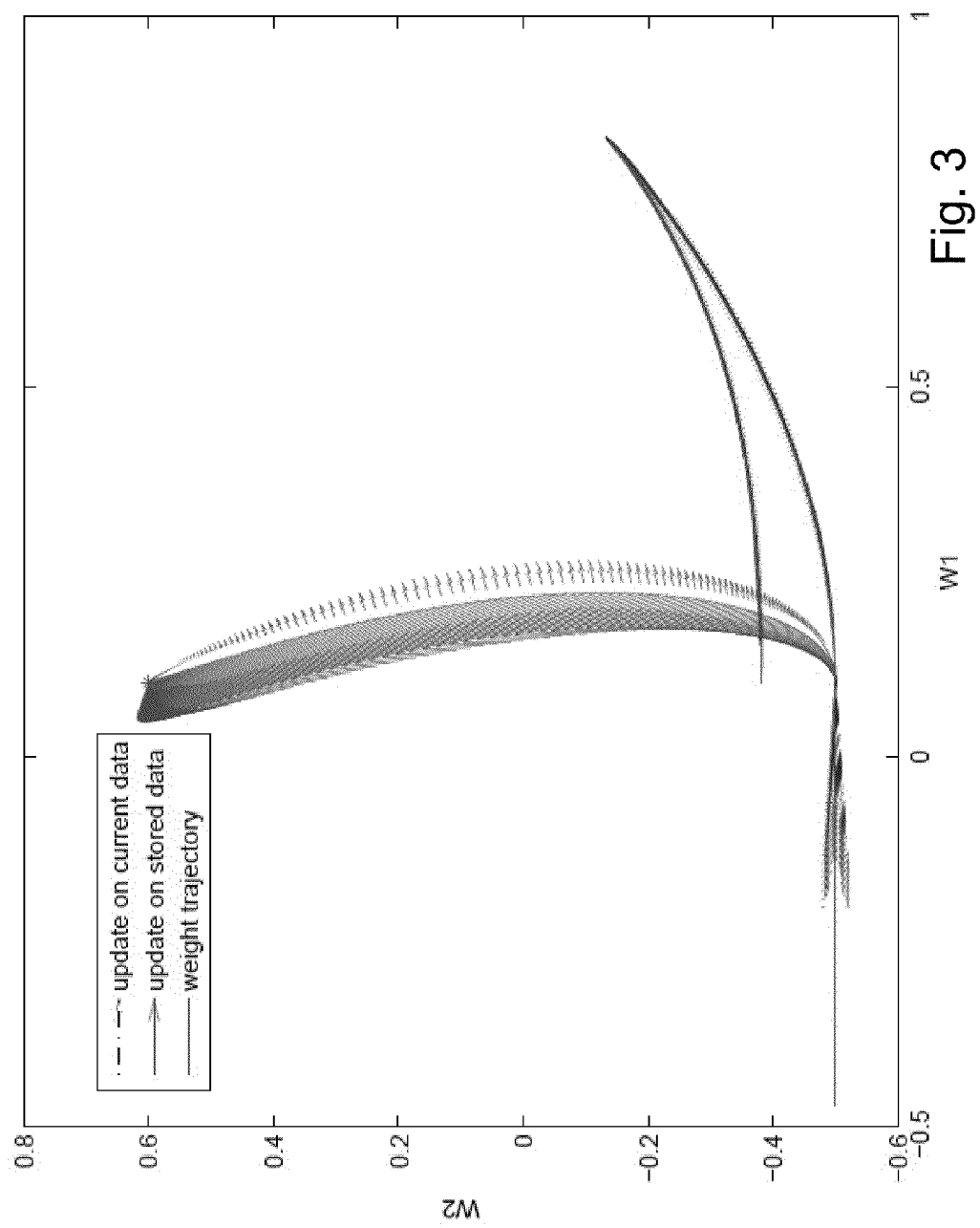
FIG. 3 is a graph comparing trajectories of an online estimate of ideal weights in a weight space, according to an exemplary embodiment of the present invention.

FIG. 3 compares the trajectories of the online estimate of the ideal weights in the weight space. The term "weight trajectory" in the key of this figure refers to the evolution of the weights as a function of time. The dotted arrows indicate the direction of update based only on current data, while the solid arrows denote the direction of weight updates based only on stored data. It can be seen that, at the end of the simulation, the concurrent learning gradient descent algorithm of Theorem 1 arrives at the ideal weights (denoted by *), while the baseline gradient algorithm does not. As shown by the arrows, the weight updates based on both past and current data can combine two linearly independent directions to improve weight convergence. This illustrates the effect of using recorded data when Condition 1 is met. For this simulation, the learning rate was set to $\Gamma=5$ for both concurrent learning and baseline gradient descent case. Data points satisfying $v(t)-y(t)>0.05$ were selected for storage and were used by the concurrent learning algorithm.

B. Adaptive Control

Following, numerical simulation results of adaptive control of an inverted pendulum model are presented. Let $\Theta$ denote the angular position of the pendulum, and let $\delta$ denote the control input. In that case, the unstable pendulum dynamics under consideration are given by:

$$\ddot{\theta} = \delta + \sin\theta - |\dot{\theta}|\dot{\theta} + 0.5e^{\theta} \quad (37)$$

A second order reference model with natural frequency and damping ratio of 1 is used. The linear control is given by $u_{pd} = -1.5\theta - 1.3\dot{\theta}$, and the learning rate is set to $\Gamma_w = 3.5$. The initial conditions are set to $x(0) = [\theta(0), \dot{\theta}(0)] = [1, 1]$. The model uncertainty is given by $y = W^{*T}\Phi(x)$ with $W^* = [-1, 1, 0.5]$ and $\Phi(x) = [\sin(\theta), |\dot{\theta}|\dot{\theta}, e^{\theta}]$. A step in position ($\Phi_c = 1$) is commanded at $t=20$ seconds.

Figure 4:
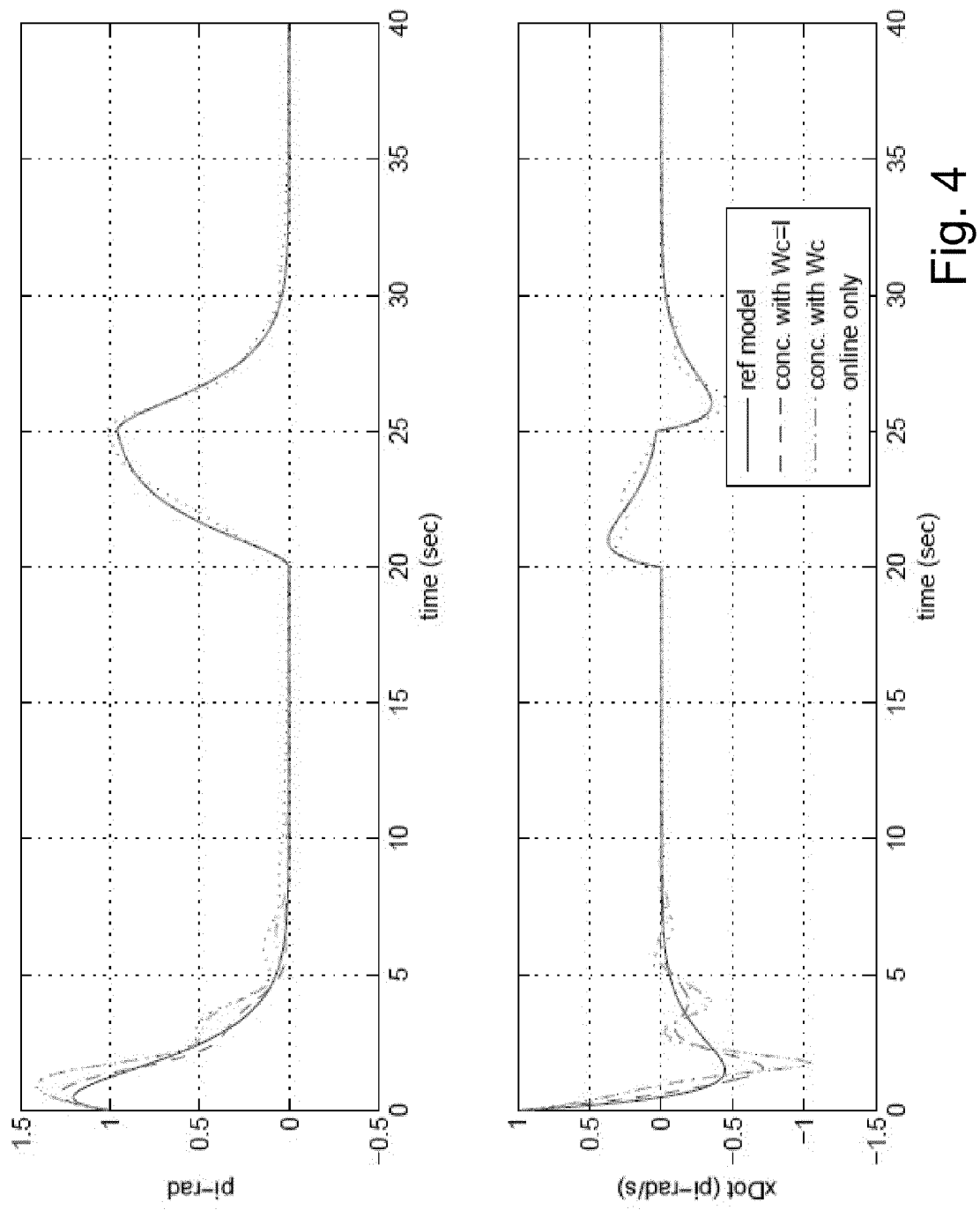
FIG. 4 is a graph comparing reference model tracking performance of a baseline adaptive control law to concurrent learning adaptive laws, according to an exemplary embodiment of the present invention.

FIG. 4 compares the reference model tracking performance of the baseline adaptive control law of Equation 19, the concurrent learning adaptive law of Theorem 2 ($W_c(t)=I$), and the concurrent learning adaptive law Theorem 3 ($W_c(t)$ as in Equation 30). It can be seen that in both cases, the concurrent learning adaptive laws can outperform the baseline adaptive law, especially when tracking the step commanded at $t=20$ seconds.

Figure 5:
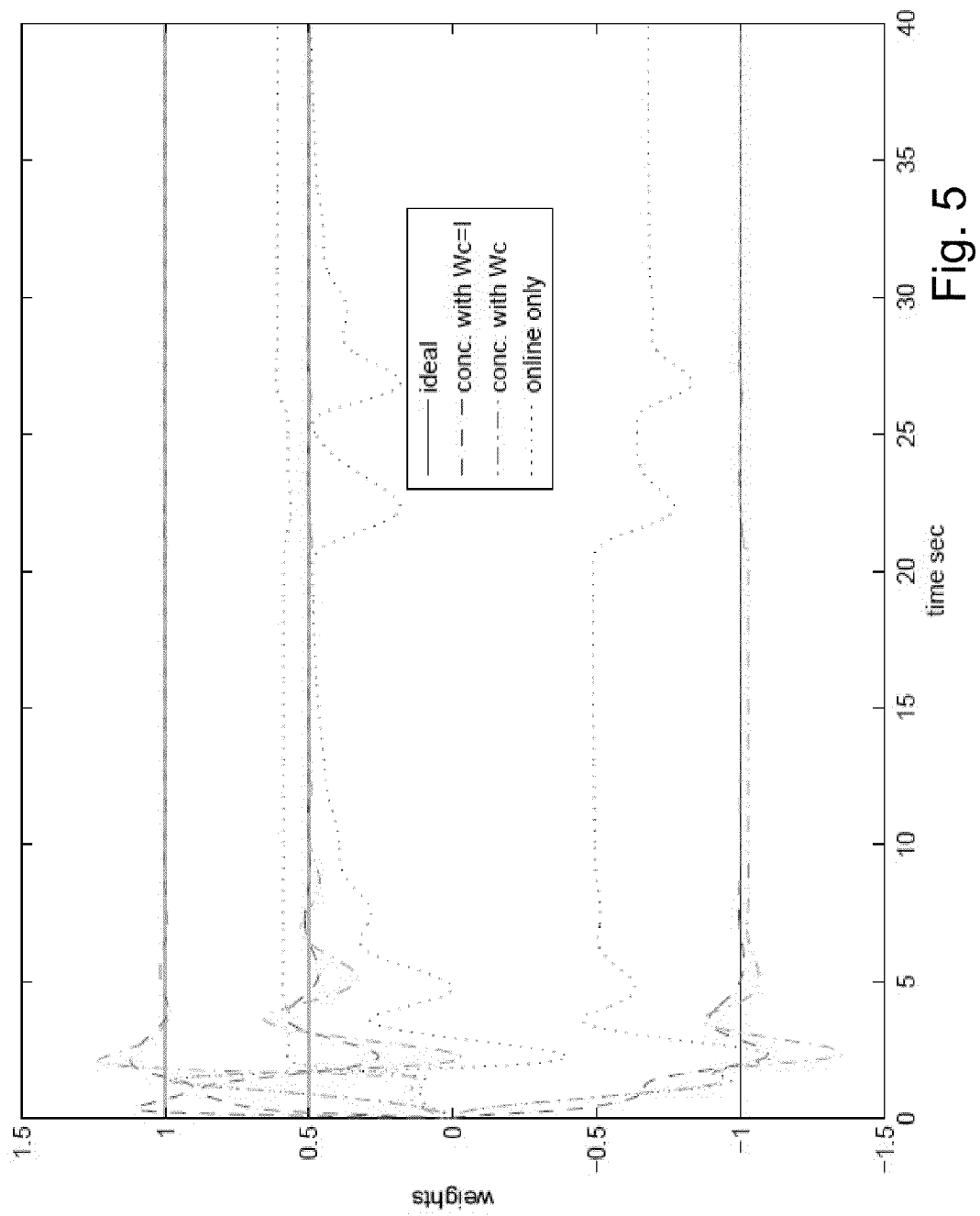
FIG. 5 is a graph illustrating evolution of adaptive weights for concurrent learning adaptive laws, according to an exemplary embodiment of the present invention.

The reason for this becomes clear when we examine the evolution of weights in FIG. 5. As shown in FIG. 5, for both concurrent learning laws, the weights can be very close to their ideal values by this time, whereas for the baseline adaptive law, this is not the case. This difference in performance is indicative of the benefit of parameter convergence. In order to make a fair comparison, the same learning rate ($\Gamma_w$) is used, but it is noted that the concurrent learning adaptive law of Theorem 2 outperforms the other two laws. It should also be noted that increasing $\Gamma_w$ for the baseline case will result in an oscillatory response. Furthermore, note that for approximately up to 3 seconds, the tracking performance of the concurrent learning adaptive law of Theorem 3 is similar to that of the baseline adaptive law, indicating that until this time, the set $N_\Phi$ is empty. As sufficient stored data points become available such that the set $N_\Phi$ starts to become nonempty, the performance of the concurrent learning adaptive law of Theorem 3 can approach that of the concurrent learning adaptive law of Theorem 2.

IV. Applications of the Neural Network Adaptive Control System

Various embodiments of the neural network adaptive control system 100 can implement the algorithms discussed above in various applications, including, for example and not limitation, a high fidelity flight simulator and a concurrent learning adaptive controller.

A. High Fidelity Flight Simulator

Below, for example only, simulation results of a controller on a high fidelity simulation of the Georgia Tech GTMax Unmanned Aerial System (UAS) are presented. The GTMax is based on the YAMAHA® RMAX helicopter. The software simulation relies on a high fidelity dynamical model of the GTMax including a detailed emulation of sensors and actuators.

Implementing an exemplary neural network adaptive control system 100 of the present invention, the GTMax utilizes an approximate model inversion adaptive controller using the above algorithms with a single hidden layer (SHL) neural network having eight hidden layer nodes as the adaptive element.

Four successive step-commands in position in the x-axis direction were commanded. This control input is used to mimic simple control tasks with repeated commands. Through these maneuvers, the UAS is expected to transition between the forward flight and the hover domain repeatedly. The performance of the inner loop controller can be characterized by the errors in the three body angular rates (roll rate p, pitch rate q and yaw rate $y^r$), with the dominating variable being the pitch rate q as the rotorcraft accelerates and decelerates longitudinally.

Figure 6:
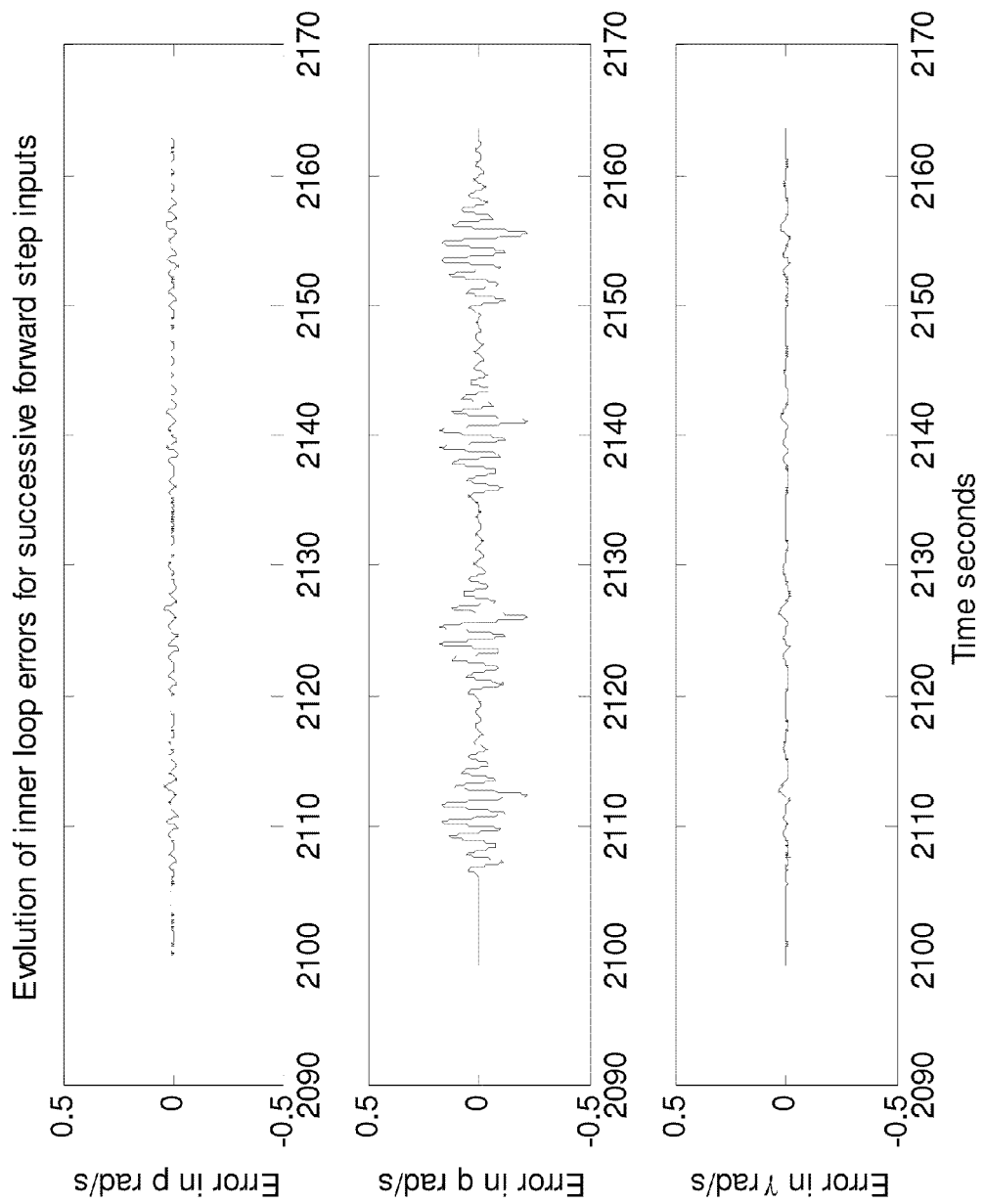
FIG. 6 illustrates evolution of inner loop errors for successive forward step maneuvers without concurrent learning, as implemented on an unmanned aerial vehicle.
Figure 7:
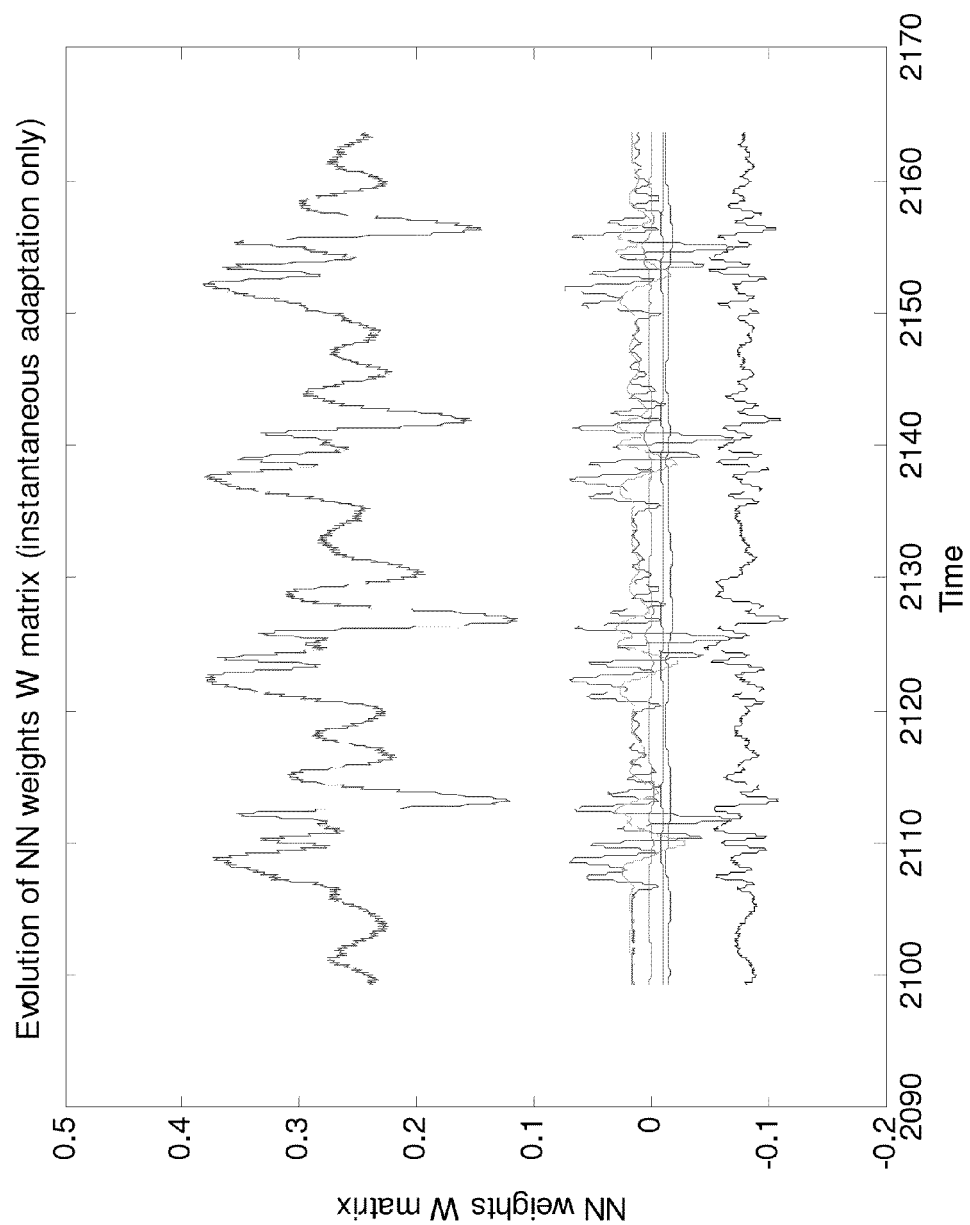
FIGS. 7-8 are graphs illustrating evolution of neural network weights without concurrent learning, as implemented on the unmanned aerial vehicle.
Figure 8:
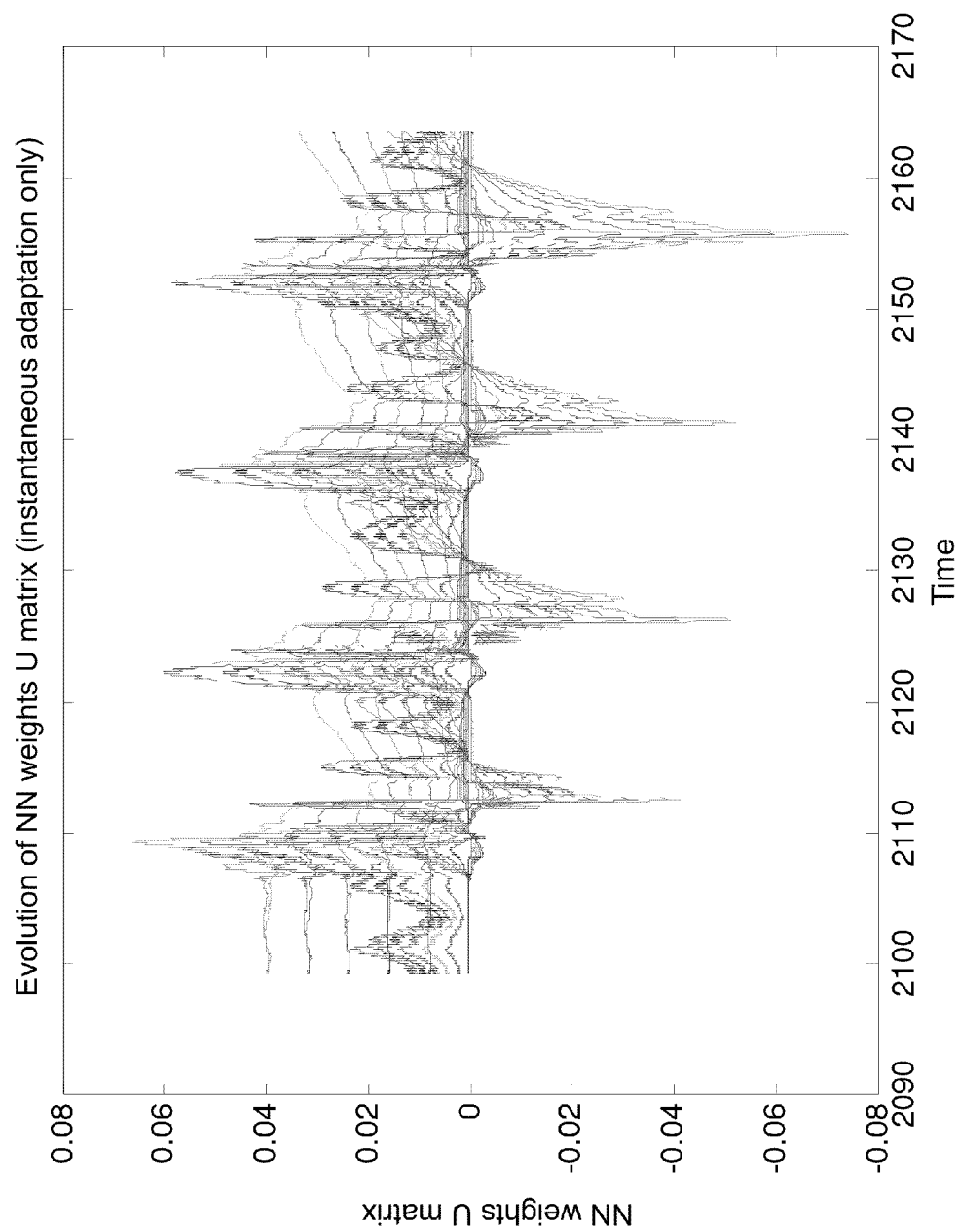

FIG. 6 illustrates the performance of the inner loop controller without concurrent learning, according to conventional neural networks. No considerable improvement in the pitch rate tracking error is seen in this controller even when the controller tracks a repeated command. The forgetting nature of the controller is further characterized by the evolution of neural network W and U weight matrices. FIG. 7 and FIG. 8 show that the neural network weights do not converge to a constant value. In fact, as the rotorcraft tracks the successive steps, the neural network weights oscillate accordingly, characterizing the instantaneous (i.e., forgetting) nature of the adaptation.

Figure 9:
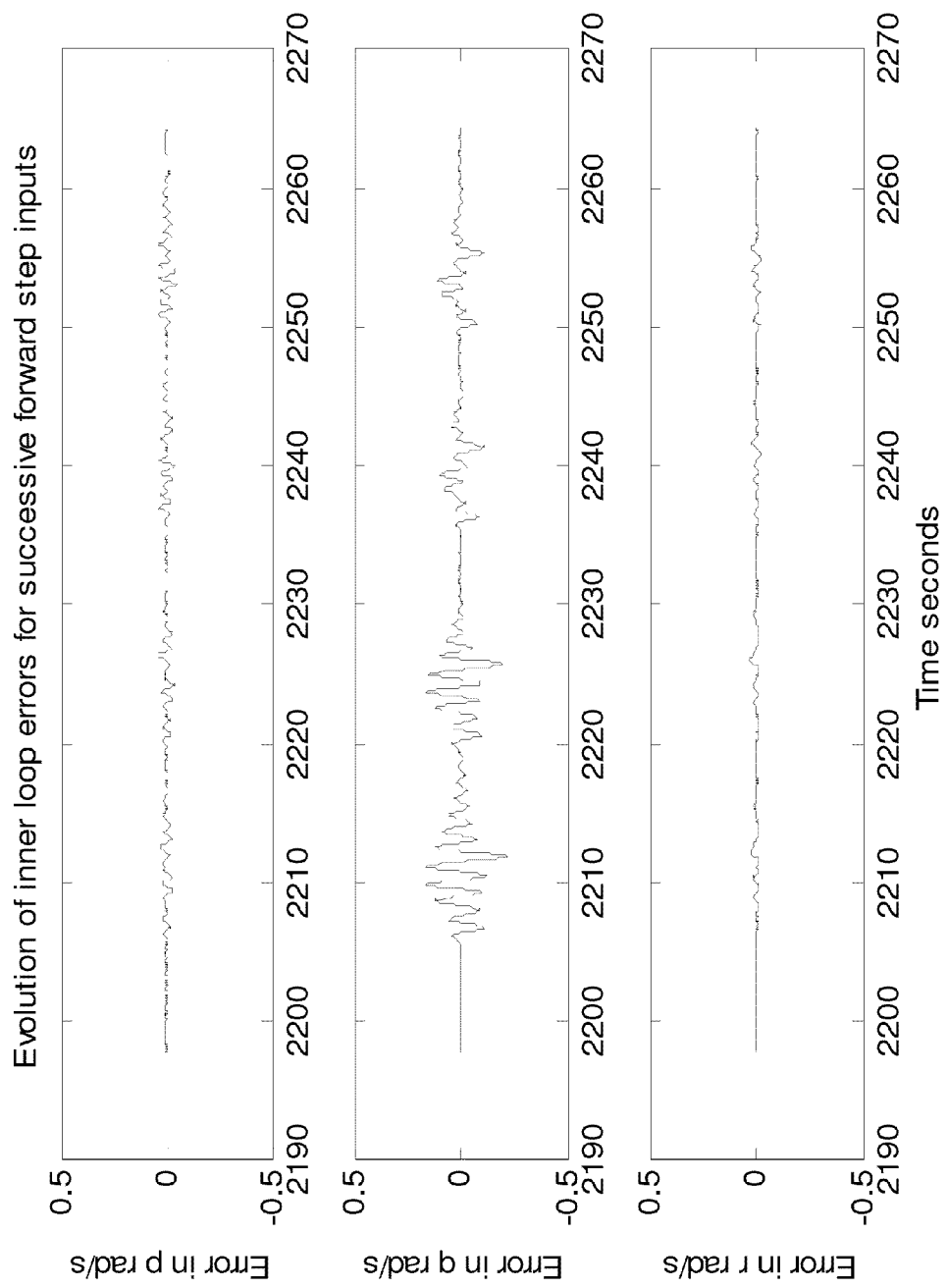
FIG. 9 illustrates evolution of inner loop error for successive forward step maneuvers with concurrent learning, according to an exemplary embodiment of the present invention, as implemented on the unmanned aerial vehicle.
Figure 10:
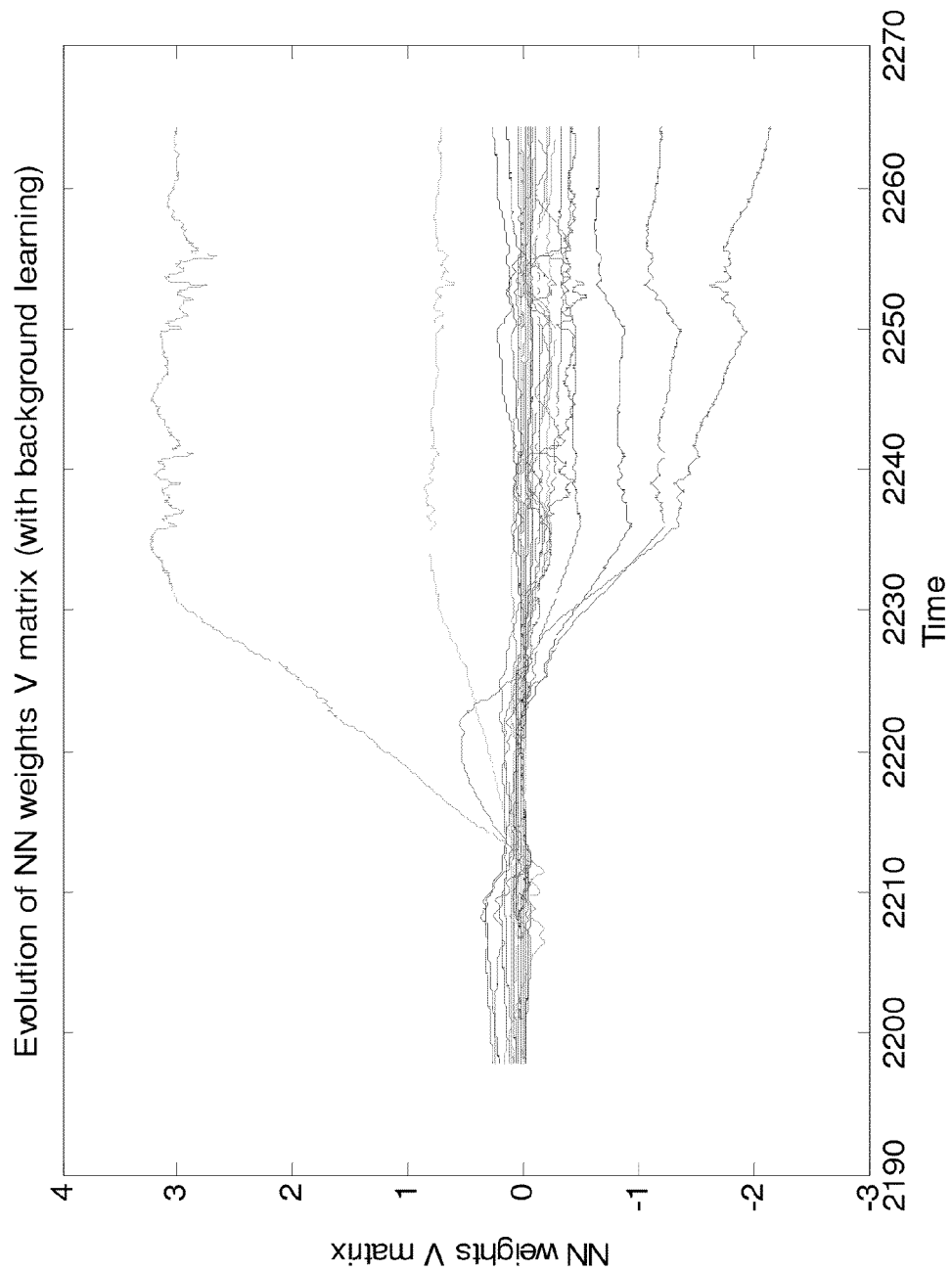
FIGS. 10-11 are graphs illustrating evolution of neural network weights with concurrent learning, according to an exemplary embodiment of the present invention, as implemented on the unmanned aerial vehicle.
Figure 11:
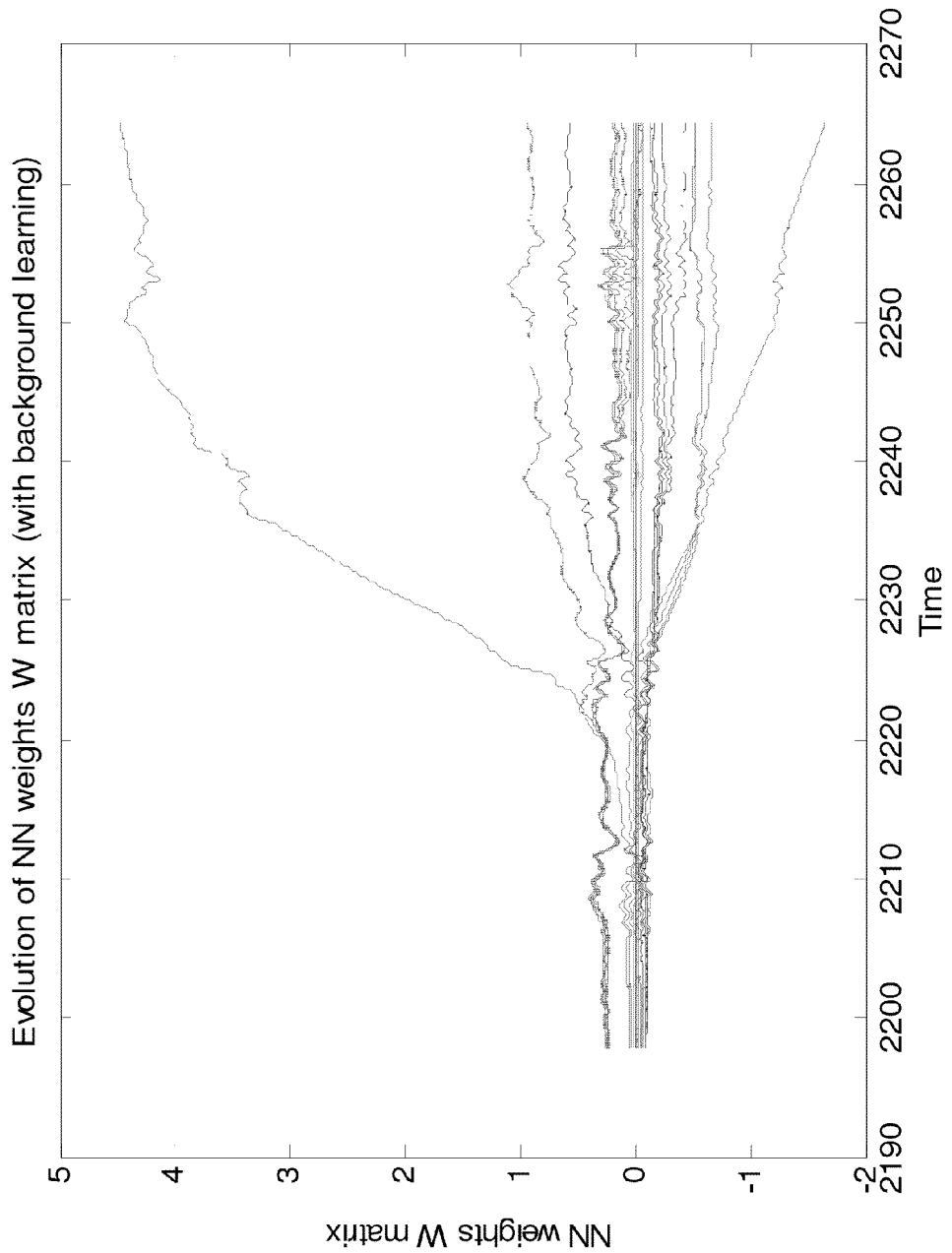

On the other hand, when a concurrent learning adaptive controller of Theorem 2 is used, an improvement in performance is observed, as characterized by the reduction in pitch rate tracking error after the first two steps. FIG. 9 shows the tracking performance of the concurrent learning adaptive controller. FIGS. 10-11 show that when concurrent learning is used, the neural network weights do not exhibit periodic behavior and tend to separate and approach constant values. This behavior indicates an alleviation of the rank 1 condition.

B. Concurrent Learning Adaptive Controller on a VTOL UAS

A neural network adaptive control system 100 according to an embodiment of the present invention can implement the above algorithms in concurrent learning for the augmentation of adaptive control laws. In this way, long term learning can be incorporated to improve the performance of a controller. This capability is of interest to various commercial adaptive control applications. In particular, for the control of Unmanned Aerial Vehicles and other systems that operate over a wide range of the state space.

In this section, flight test results are presented to characterize the benefits of using concurrent learning adaptive control. The flight tests presented here were executed on the Georgia Tech GTMax rotorcraft UAS. It should be noted that the same baseline law learning rates, reference model parameters, approximate inversion model, and other parameters were used both with and without concurrent learning. First, the flight test results for a series of forward steps are presented below, and then the results from an aggressive trajectory tracking maneuver are presented, where the UAS tracks an elliptical trajectory with aggressive velocity and acceleration profile.

Figure 12:
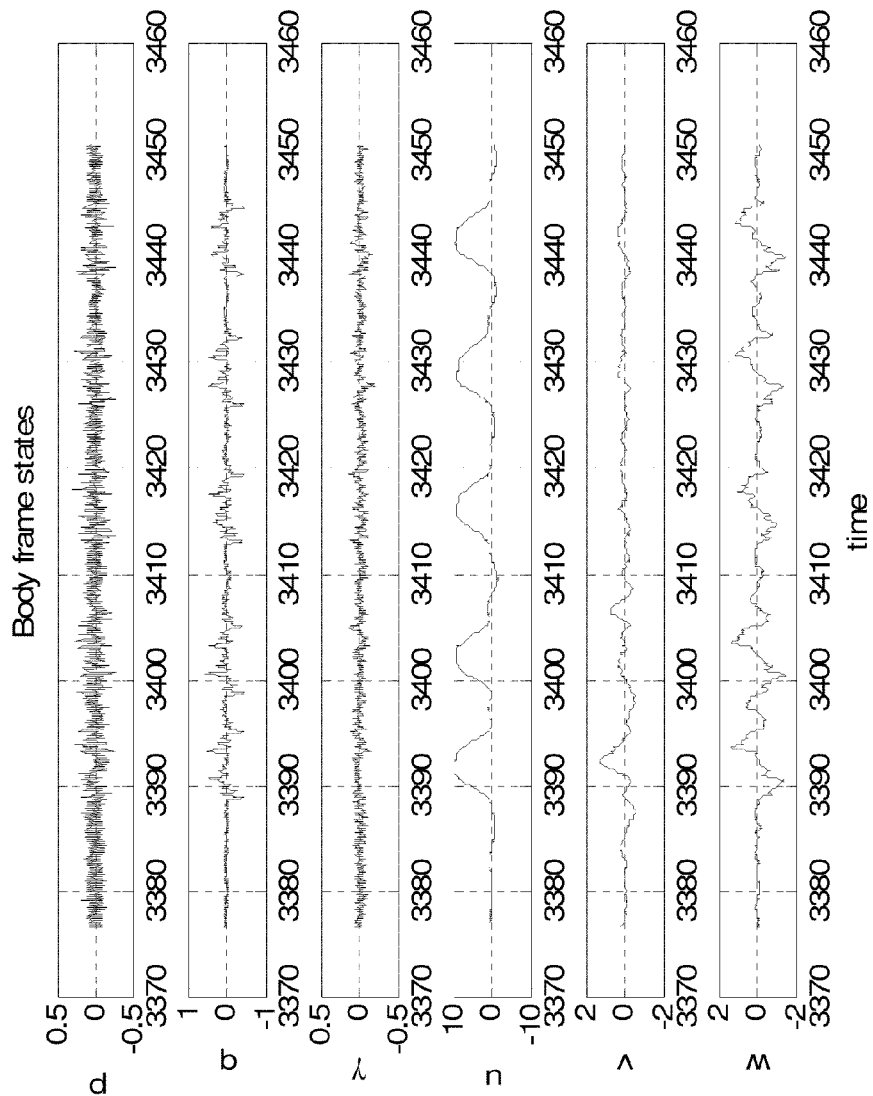
FIG. 12 illustrates body frame states from recorded flight data for a chain of forward step commands, according to an exemplary embodiment of the present invention, as implemented on the unmanned aerial vehicle.
Figure 13:
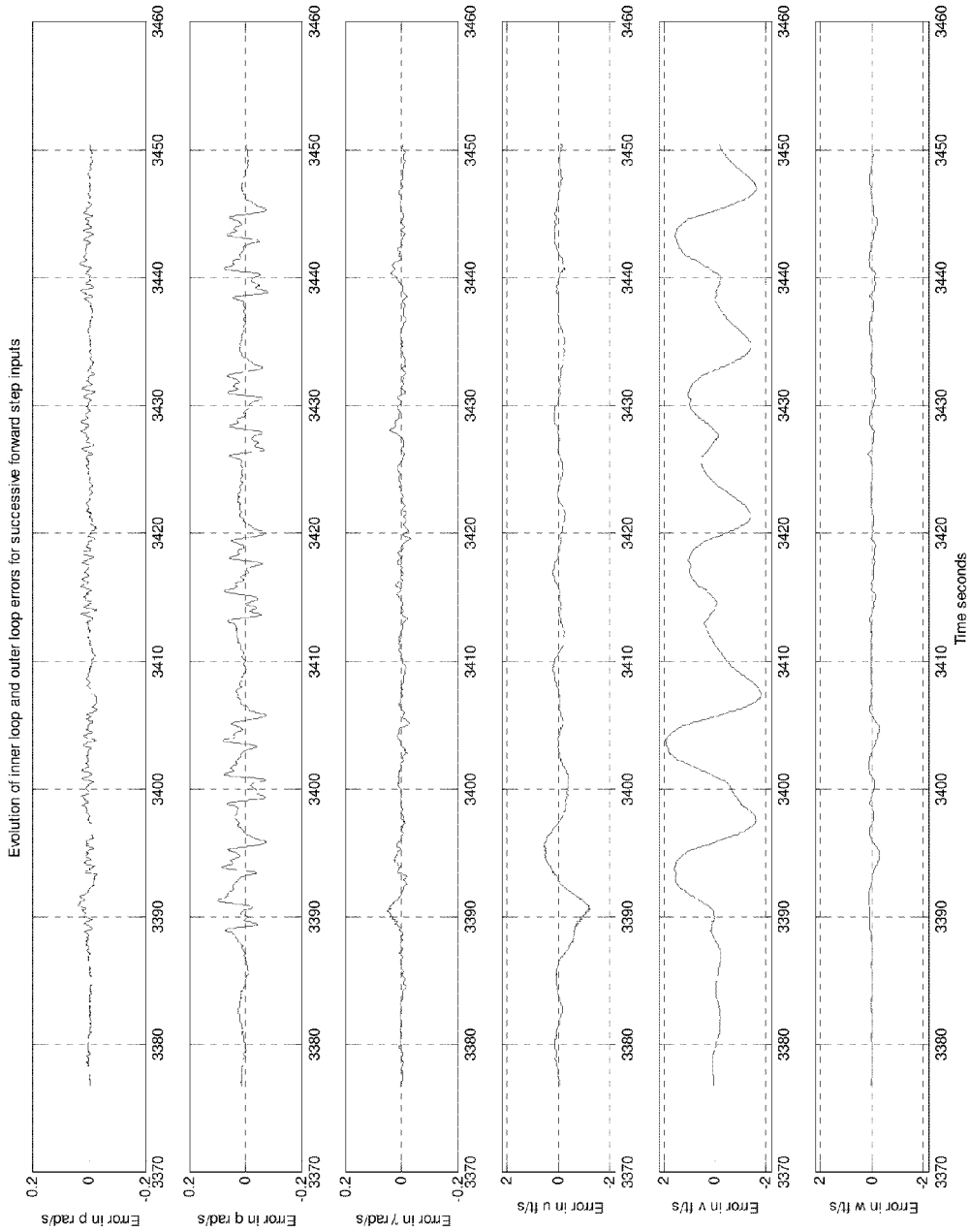
FIG. 13 illustrates evolution of inner and outer loop errors, according to an exemplary embodiment of the present invention, as implemented on the unmanned aerial vehicle.

The repeated forward step maneuvers are chosen to demonstrate a situation where the controller performs a simple repeated task. FIG. 12 shows the body frame states from recorded flight data for a chain of forward step commands, and FIG. 13 shows the evolution of inner and outer loop errors. These results assert the stability, in the sense of Uniformly Ultimately Bounded ("UUB"), of the concurrent learning controller of Theorem 2.

Figure 14:
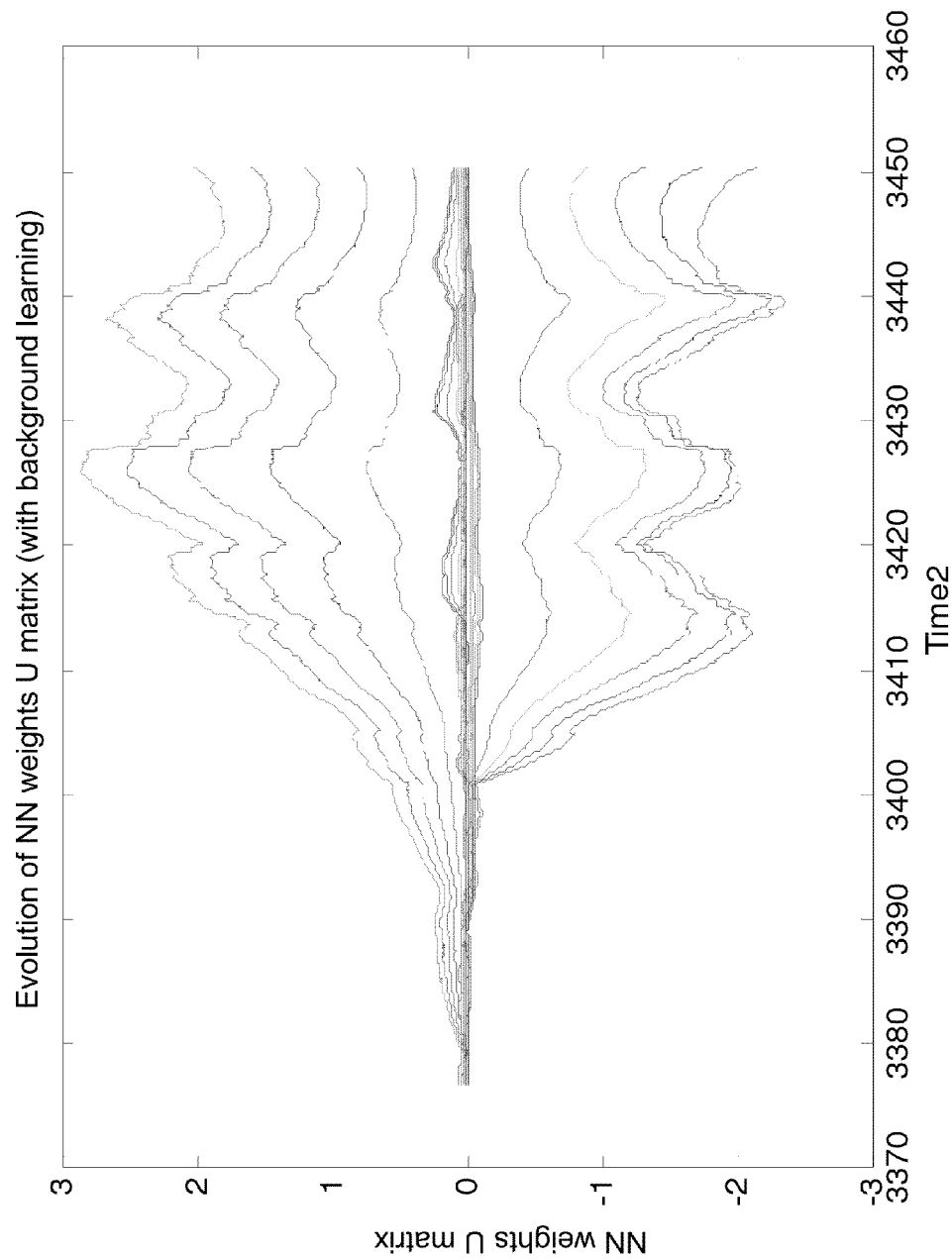
FIGS. 14-15 are graphs illustrating evolution of neural network weights with concurrent learning, according to an exemplary embodiment of the present invention, as implemented on the unmanned aerial vehicle.
Figure 15:
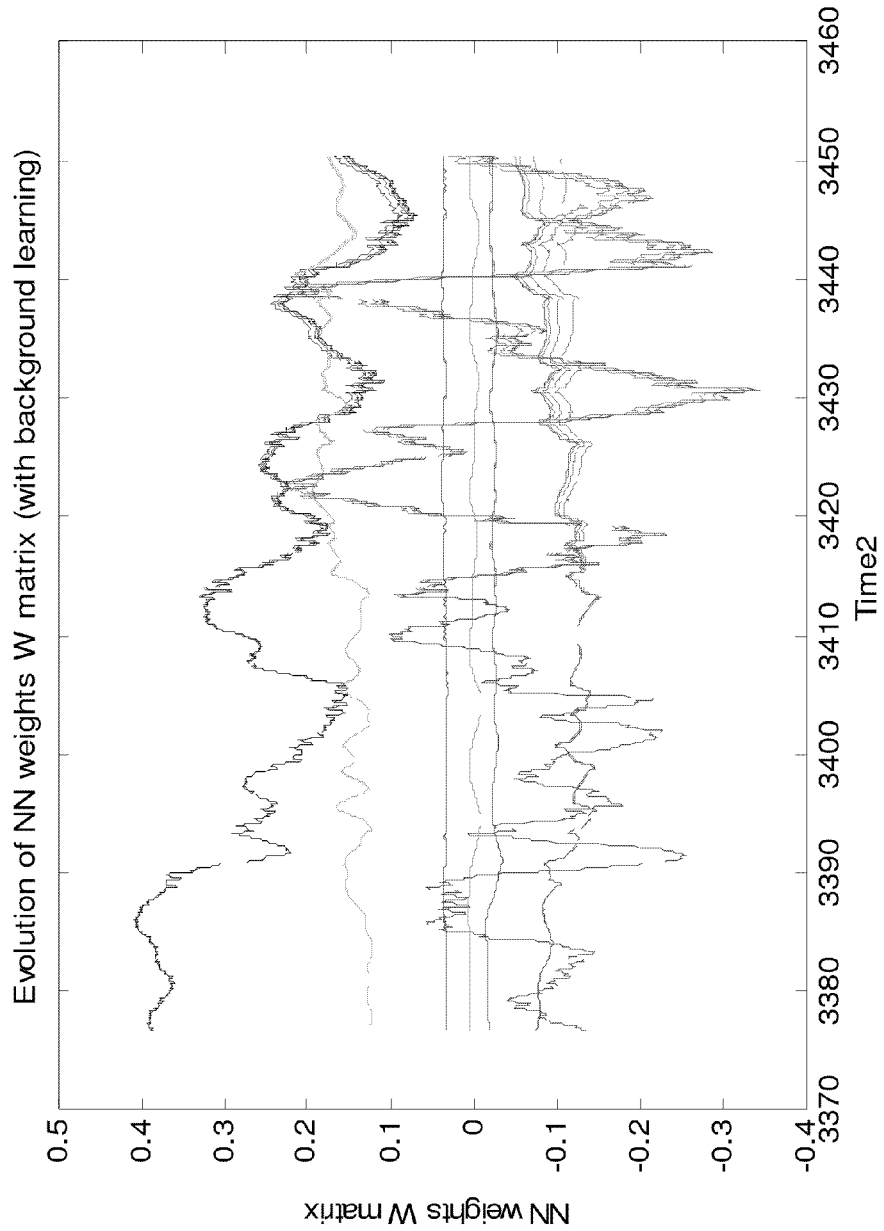
Figure 16:
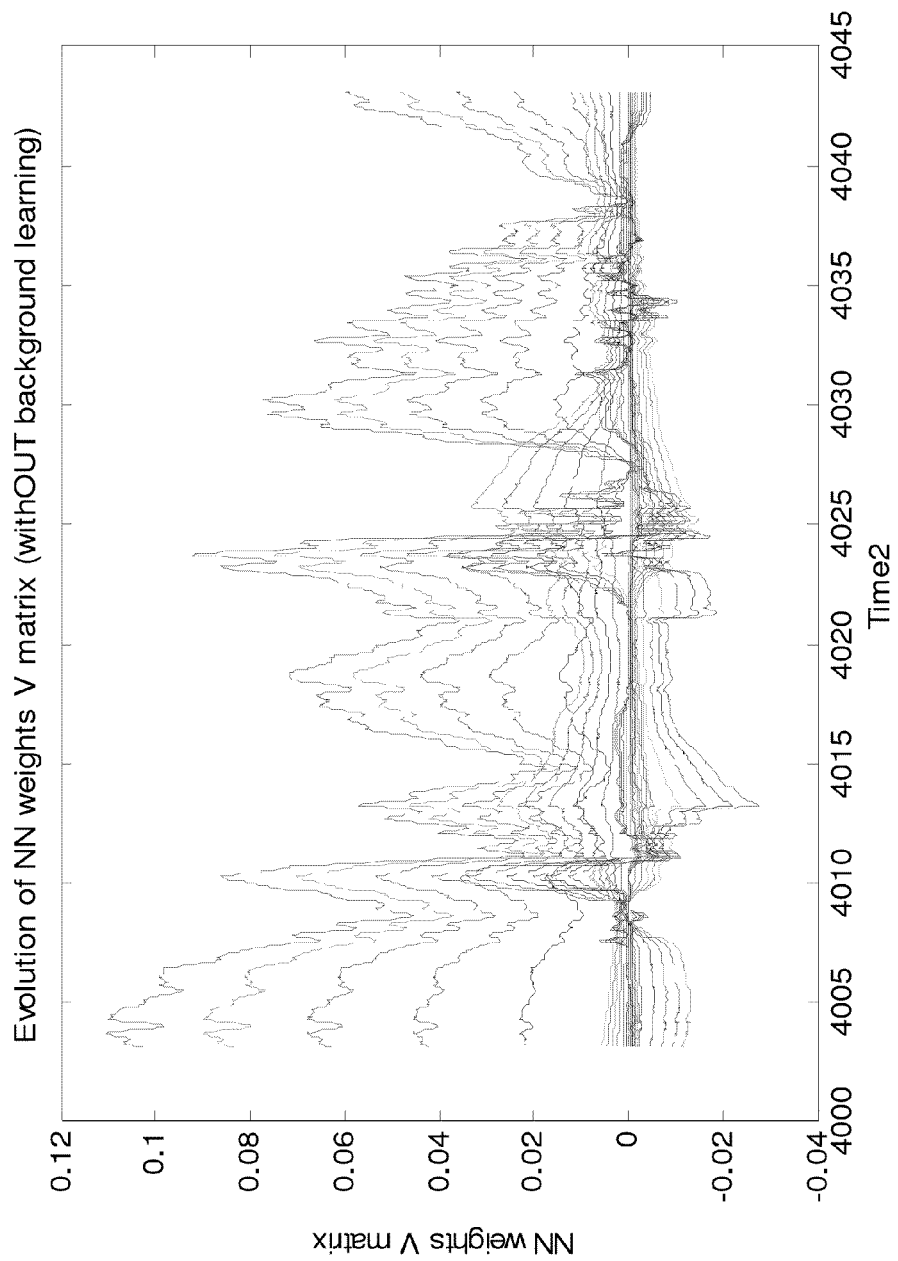
FIGS. 16-17 are graphs illustrating evolution of neural network weights without concurrent learning, as implemented on the unmanned aerial vehicle.
Figure 17:
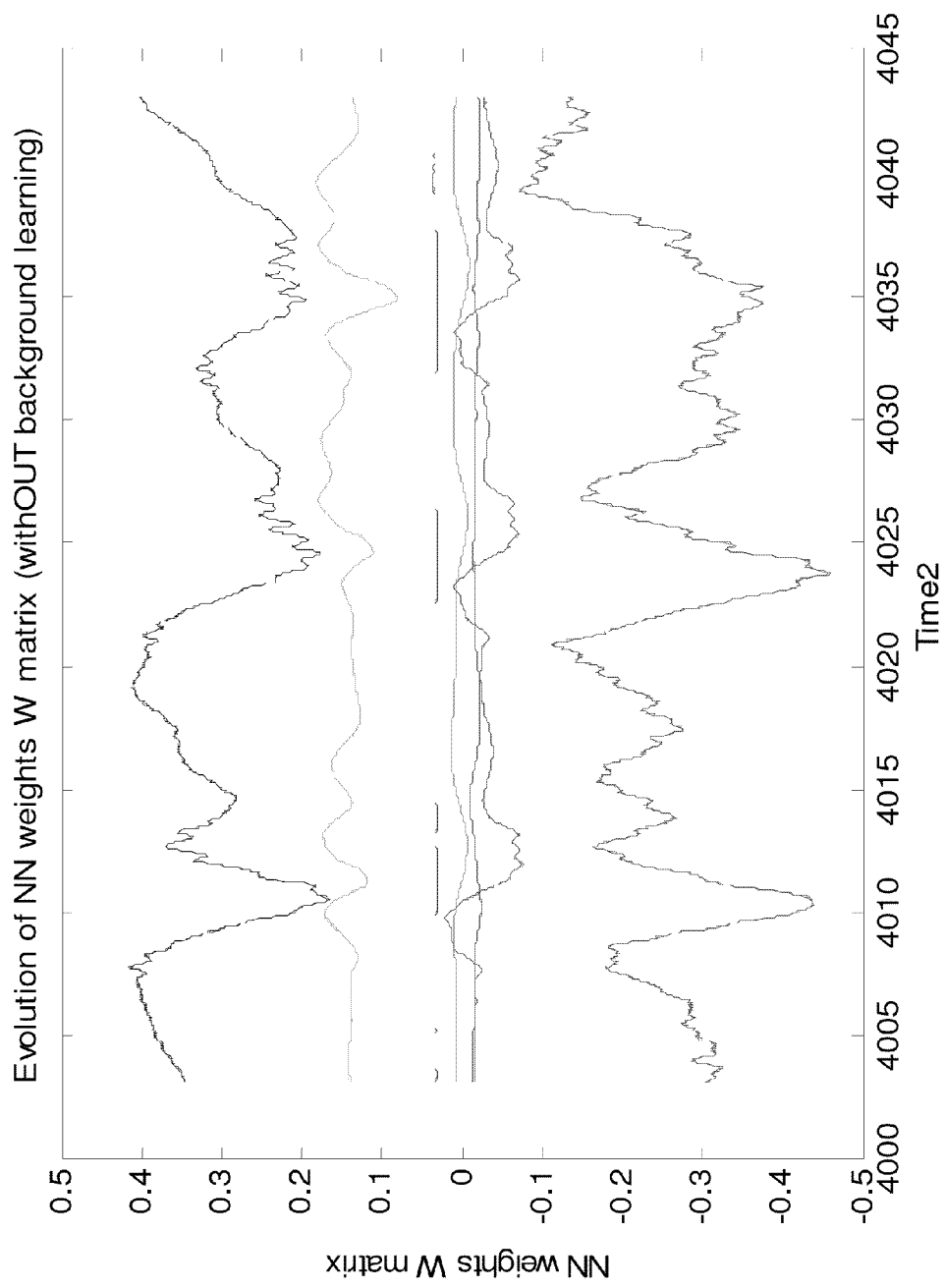

FIGS. 14-15 show the evolution of neural network weights as the rotorcraft tracks repeated steps using the concurrent learning controller of Theorem 2. The neural network U weights (FIG. 14) appear to approach constant values when concurrent learning is used. This behavior can be contrasted with FIG. 16, which shows the evolution of U weight for a similar maneuver without concurrent learning. Neural network W weights for both cases remain bounded, with the main difference being the increased separation in W weights when concurrent learning is used; indicating the alleviation of the rank-1 condition. Furthermore, we note that the weights take on much larger values when using concurrent learning. This indicates that concurrent learning adaptive law is searching for ideal weights in areas of the weight space that are never reached by the baseline adaptive without concurrent learning. The flight test results also indicate an improvement in the error profile.

In FIG. 12, we see that the lateral velocity tracking error reduces over repeated commands. In FIG. 12, for each position command in the x-axis (visible by square patterns in the plot with y-label "u"), the error in the lateral velocity (visible in plots with y-label "v") is reducing. This is indicative of the adaptive control system learning 100 that coupling and compensating for it adaptively using the disclosed algorithms. These effects in combination indicate improved performance of the concurrent learning adaptive controller. These results are of particular interest, since the maneuvers performed were conservative, and the baseline adaptive controller had already been extensively tuned.

Following, the flight test results for aggressive trajectory tracking maneuver are presented analyzed. These results are based on the UAS repeatedly tracking an elliptical trajectory with aggressive velocity (50 ft/s) and acceleration (~20 ft/s$^2$) profile. This maneuver requires the rotorcraft to track commands in multiple states, and hence, this maneuver is more complicated than the simple step commands used above. Since this maneuver involves state commands in multiple states, it is harder to visually observe an improvement in performance. Accordingly, the Euclidian norm of the error signal calculated at each time step is used below as a rudimentary performance metric.

Figure 18:
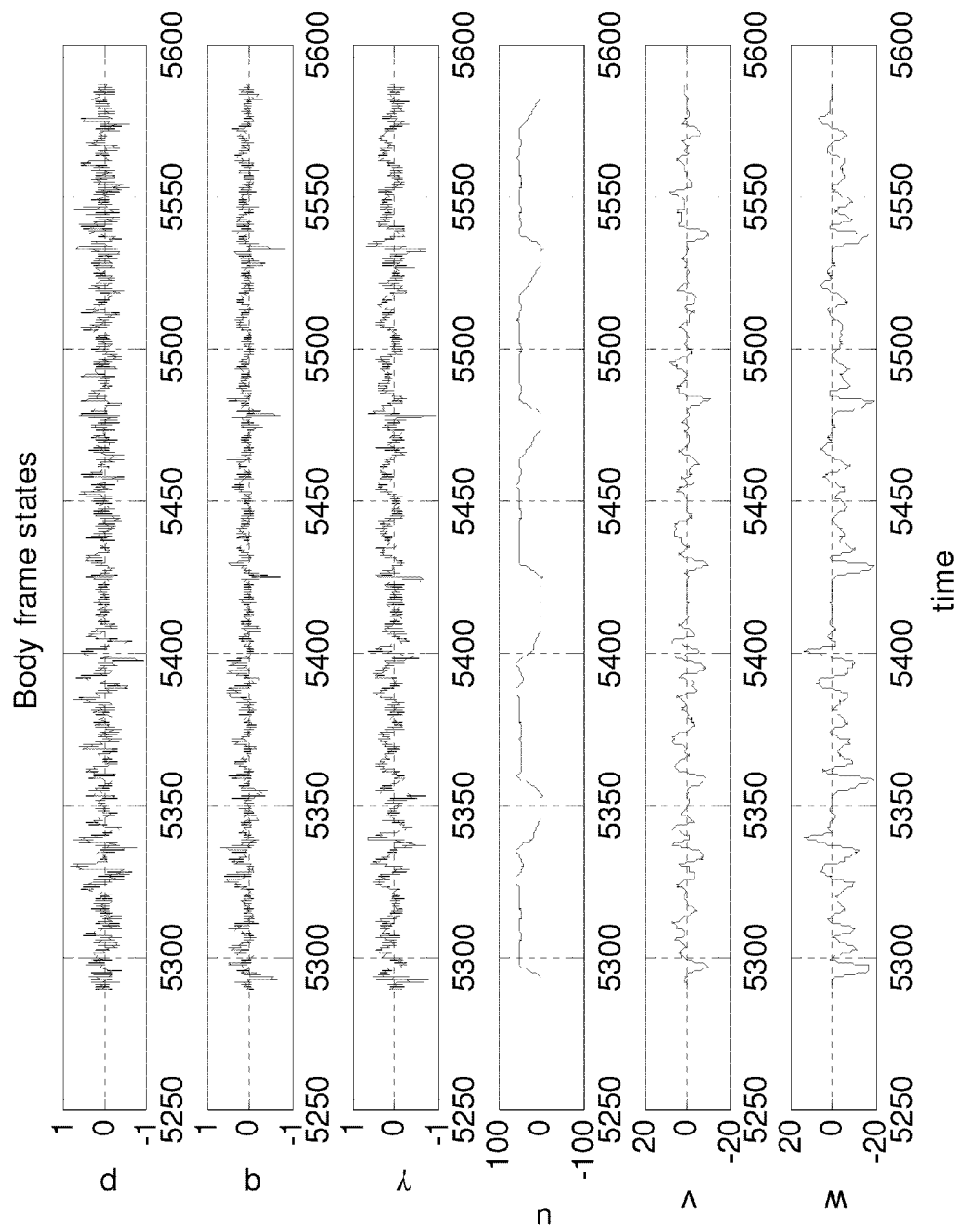
FIG. 18 illustrates recorded inner and outer loop states when repeatedly tracking aggressive trajectories, according to an exemplary embodiment of the present invention, as implemented on the unmanned aerial vehicle.

FIG. 18 shows the recorded inner and outer loop states as the rotorcraft repeatedly tracks the elliptical trajectory pattern. The variable w is the vertical speed, v is the lateral speed, and u is the forward speed. In this flight, the first two ellipses (until t=5415 seconds) are tracked with a commanded acceleration of 30 ft/sec$^2$, while the rest of the ellipses are tracked at 20 ft/.sec$^2$. In the following, we treat both these segments of the flight test separately.

Figure 19:
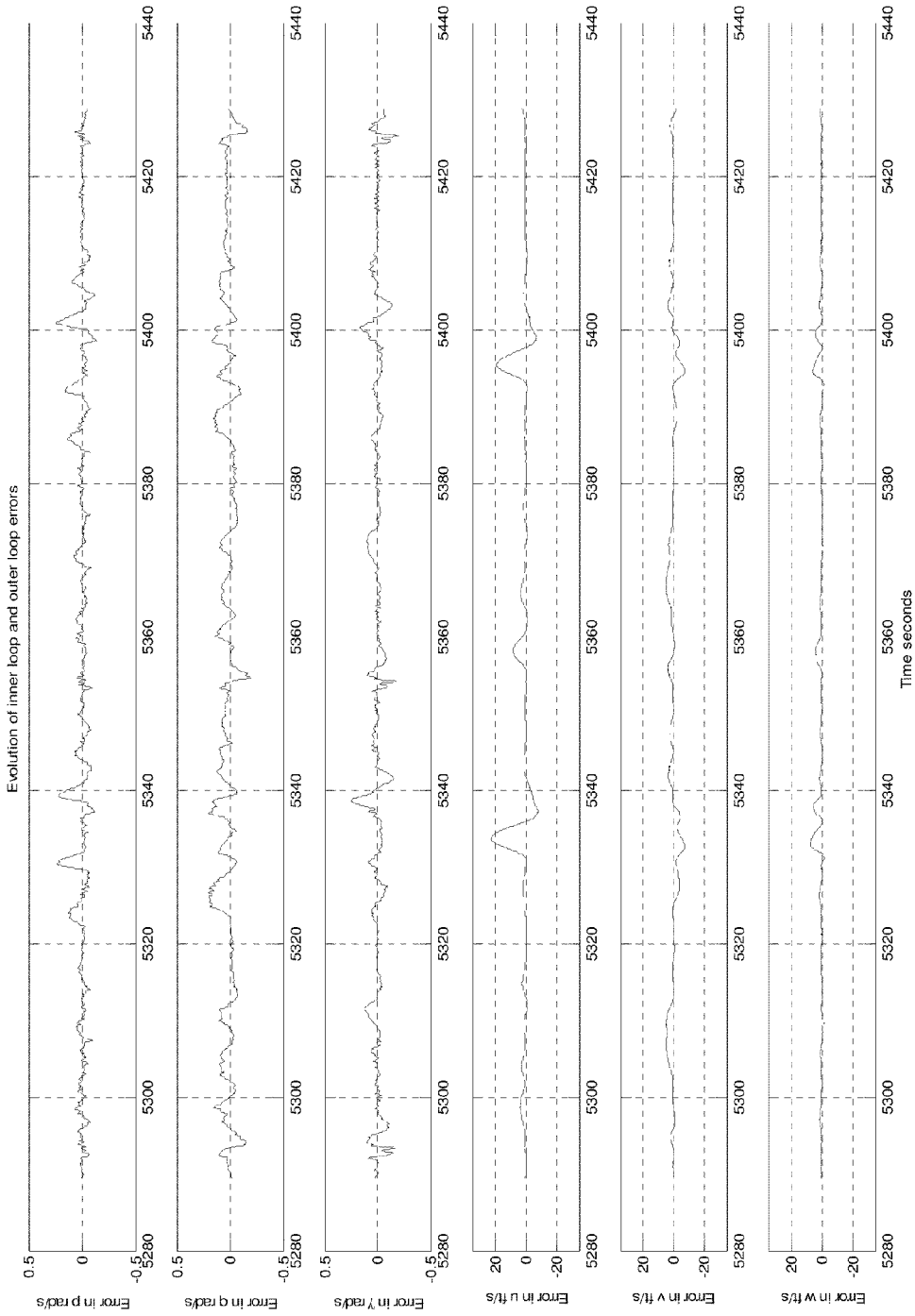
FIG. 19 illustrates tracking error profile when repeatedly tracking aggressive trajectories with collective saturation, according to an exemplary embodiment of the present invention, as implemented on the unmanned aerial vehicle.
Figure 20:
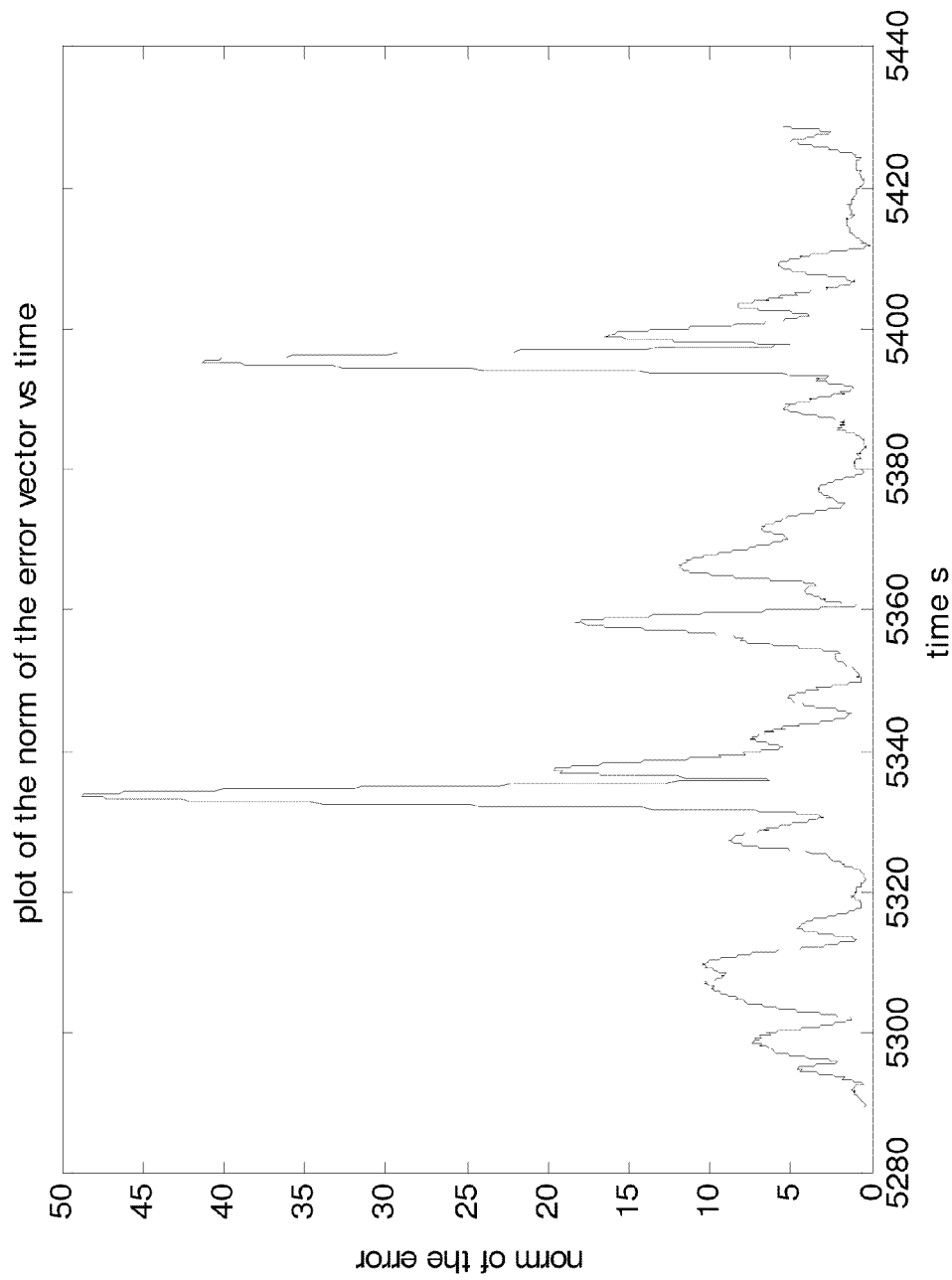
FIG. 20 is a plot of the norm of error at each time step when repeatedly tracking aggressive trajectories with collective saturation, according to an exemplary embodiment of the present invention, as implemented on the unmanned aerial vehicle.

Segment 1: Aggressive Trajectory Tracking with Saturation in the Collective Channel Due to the aggressive acceleration profile of 30 ft/s$^2$, the rotorcraft collective channels are observed to saturate while performing high velocity turns. This leads to a challenge for the adaptive controller. FIG. 19 shows the evolution of the tracking error. The variable w is the vertical speed, v is the lateral speed, and u is the forward speed. It can be seen that the tracking error in the body u channel reduces in the second pass through the ellipse, indicating improved tracking performance of the concurrent learning adaptive controller. This result is further characterized by the noticeable reduction in the norm of the tracking error calculated at every time step, as shown in FIG. 20. It should be noted that the baseline controller on the GTMax uses pseudo control hedging to hide possible actuator saturation from the neural network.

Segment 2: Aggressive Trajectory Tracking Maneuver

Figure 21:
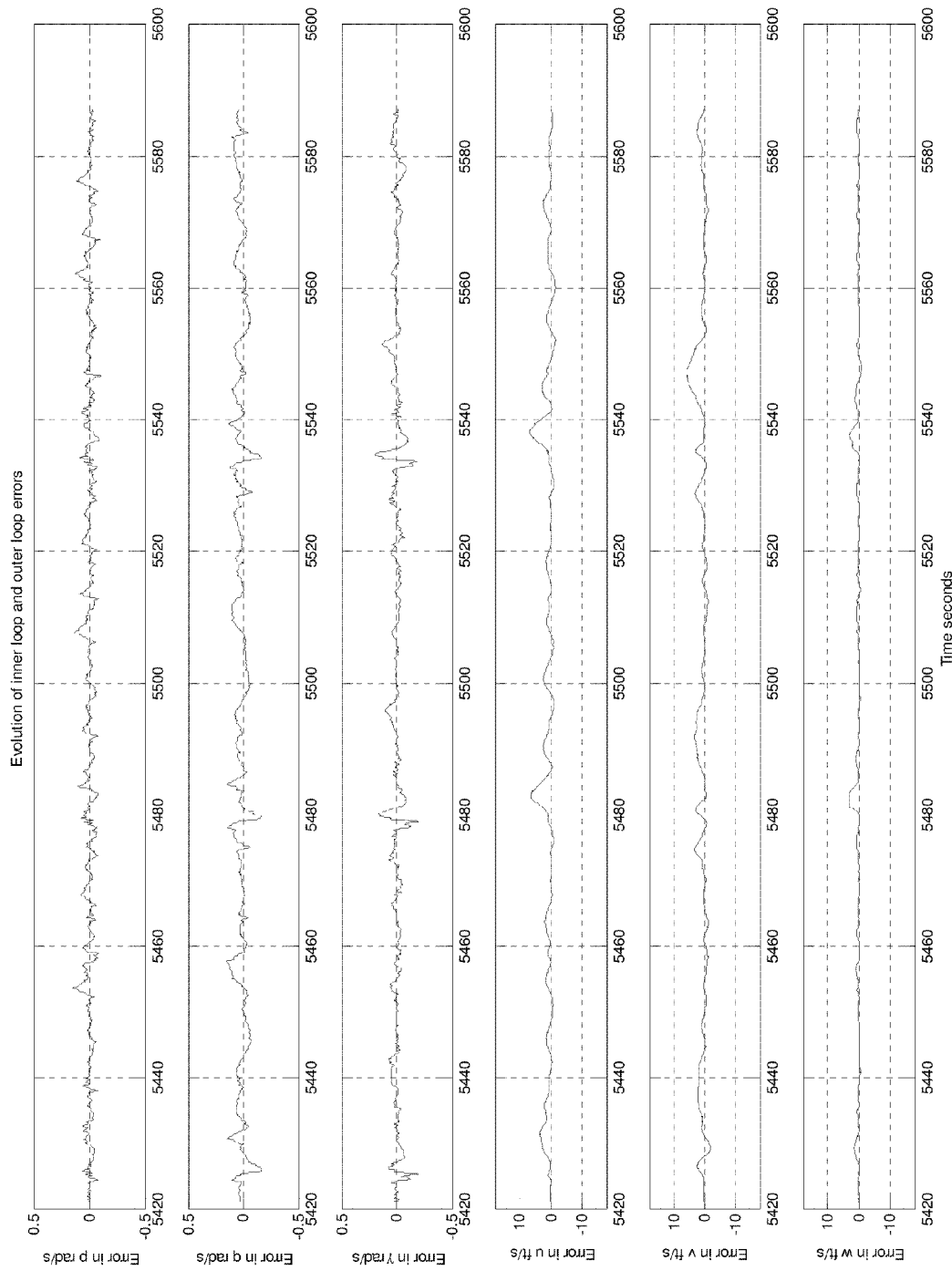
FIG. 21 illustrates evolution of tracking error when tracking aggressive trajectories without collective saturation, according to an exemplary embodiment of the present invention, as implemented on the unmanned aerial vehicle.

In this segment of the maneuver, the acceleration profile is reduced to 20 ft/sec$^2$. At this acceleration profile, no saturation in the collective channel is observed. FIG. 21 shows the evolution of tracking error for this case.

Aggressive Trajectory Maneuvers with Only Online Learning Neural Network

In order to illustrate the benefit of the combined online and concurrent learning adaptive controller we present flight test results as the rotorcraft tracks the same trajectory command as in Segment 2 above, but without a concurrent learning adaptive control.

Figure 22:
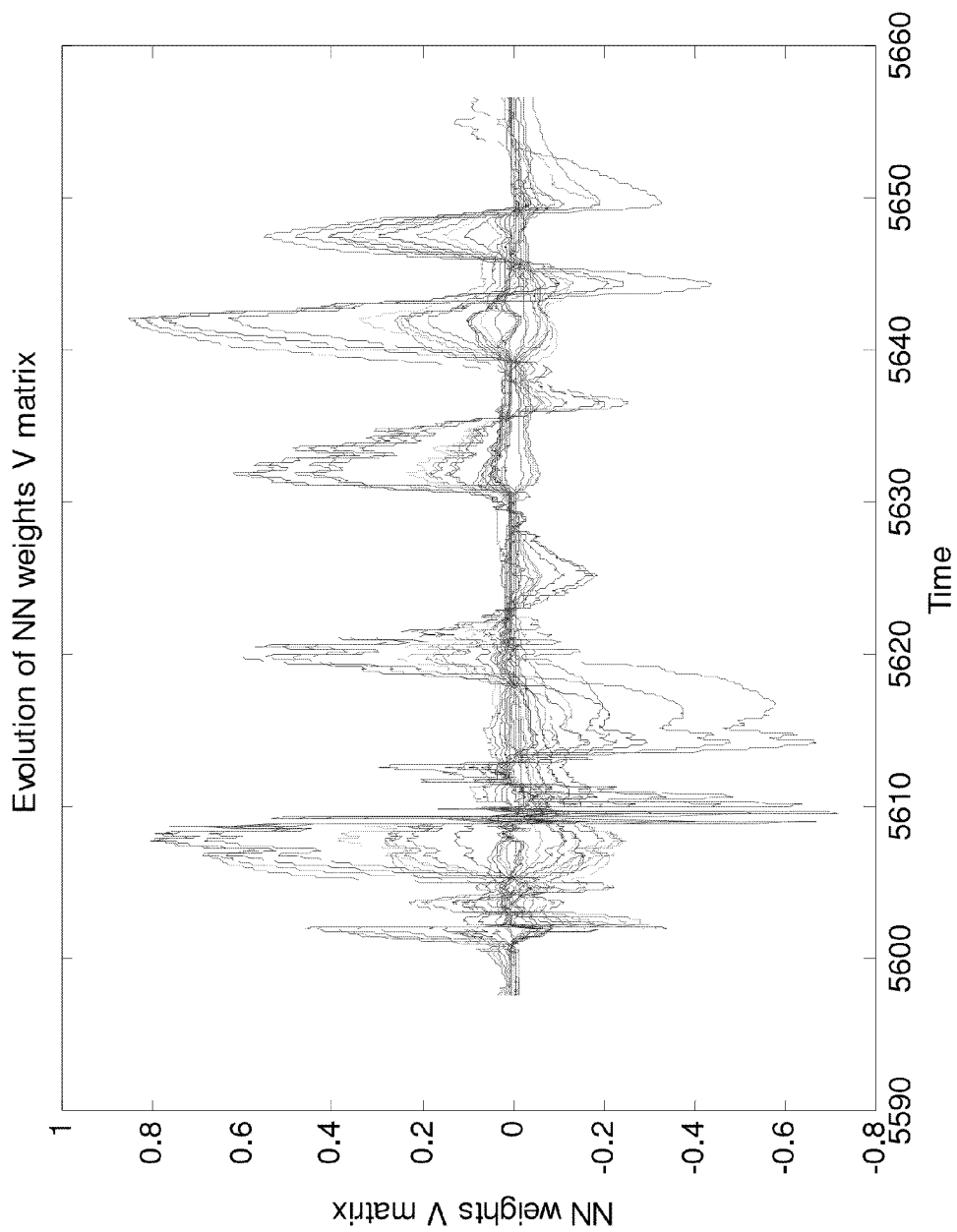
FIGS. 22-23 are graphs illustrating evolution of neural network weights without concurrent learning adaptation, as implemented on the unmanned aerial vehicle.
Figure 23:
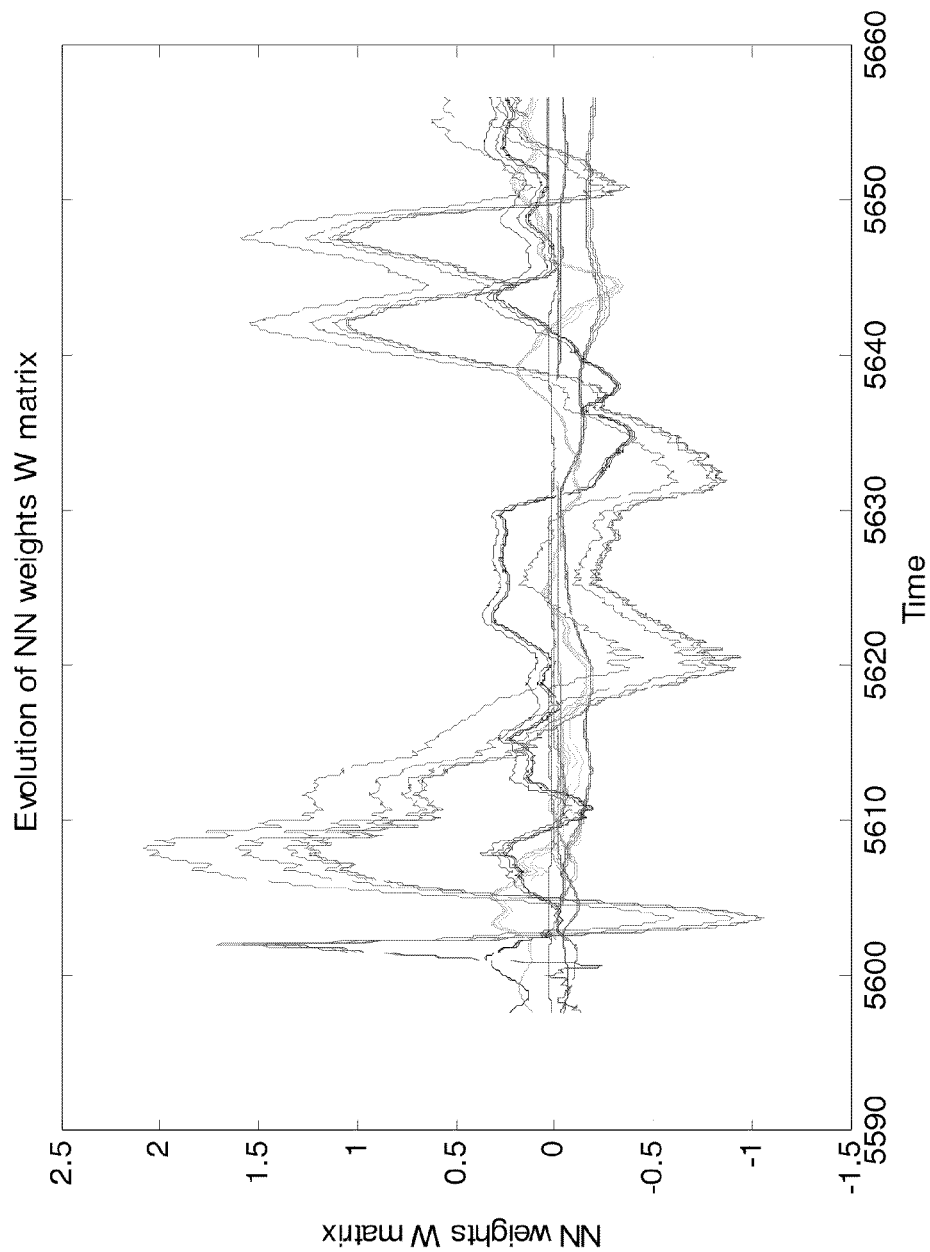
Figure 24:
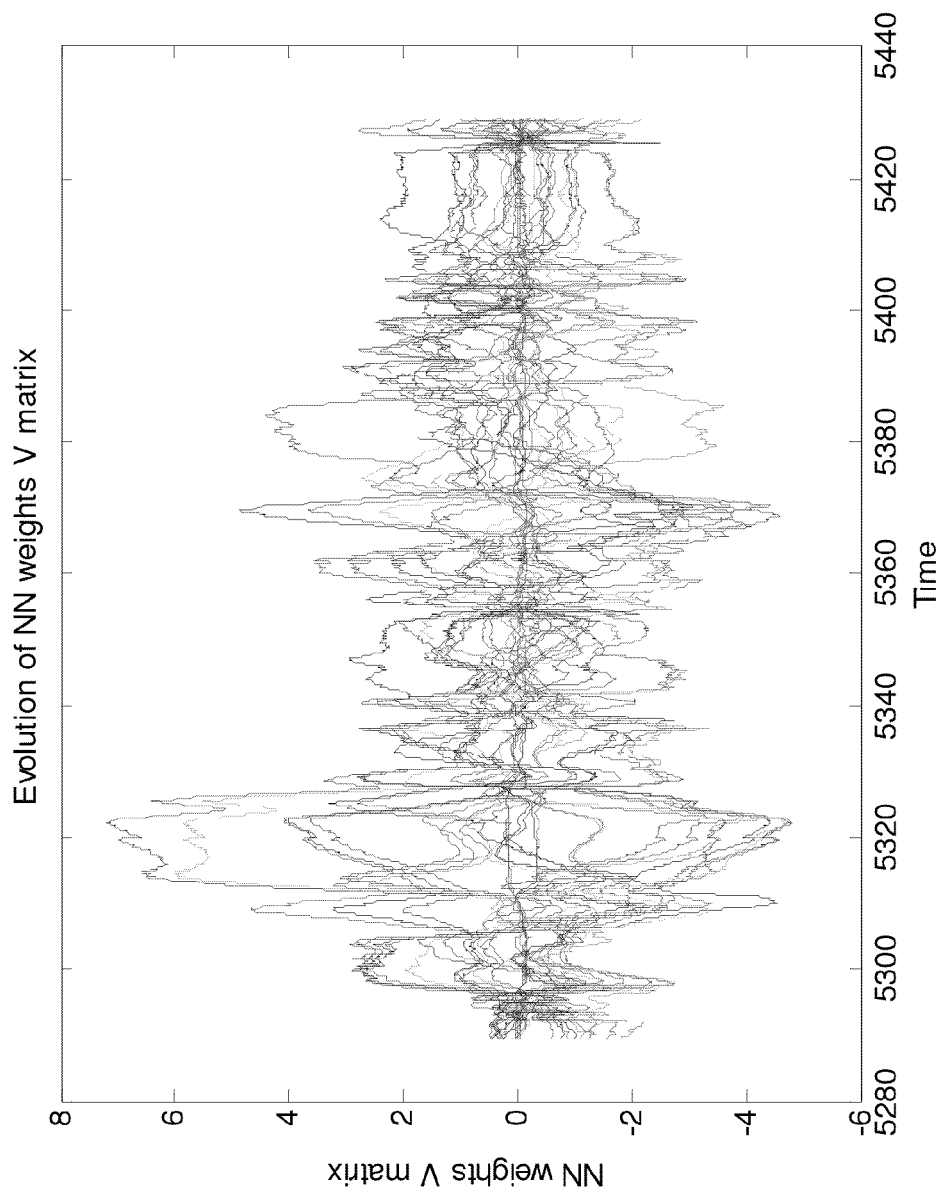
FIGS. 24-25 are graphs illustrating evolution of neural network weights when tracking aggressive trajectory with concurrent learning adaptation, according to an exemplary embodiment of the present invention, as implemented on the unmanned aerial vehicle.
Figure 25:
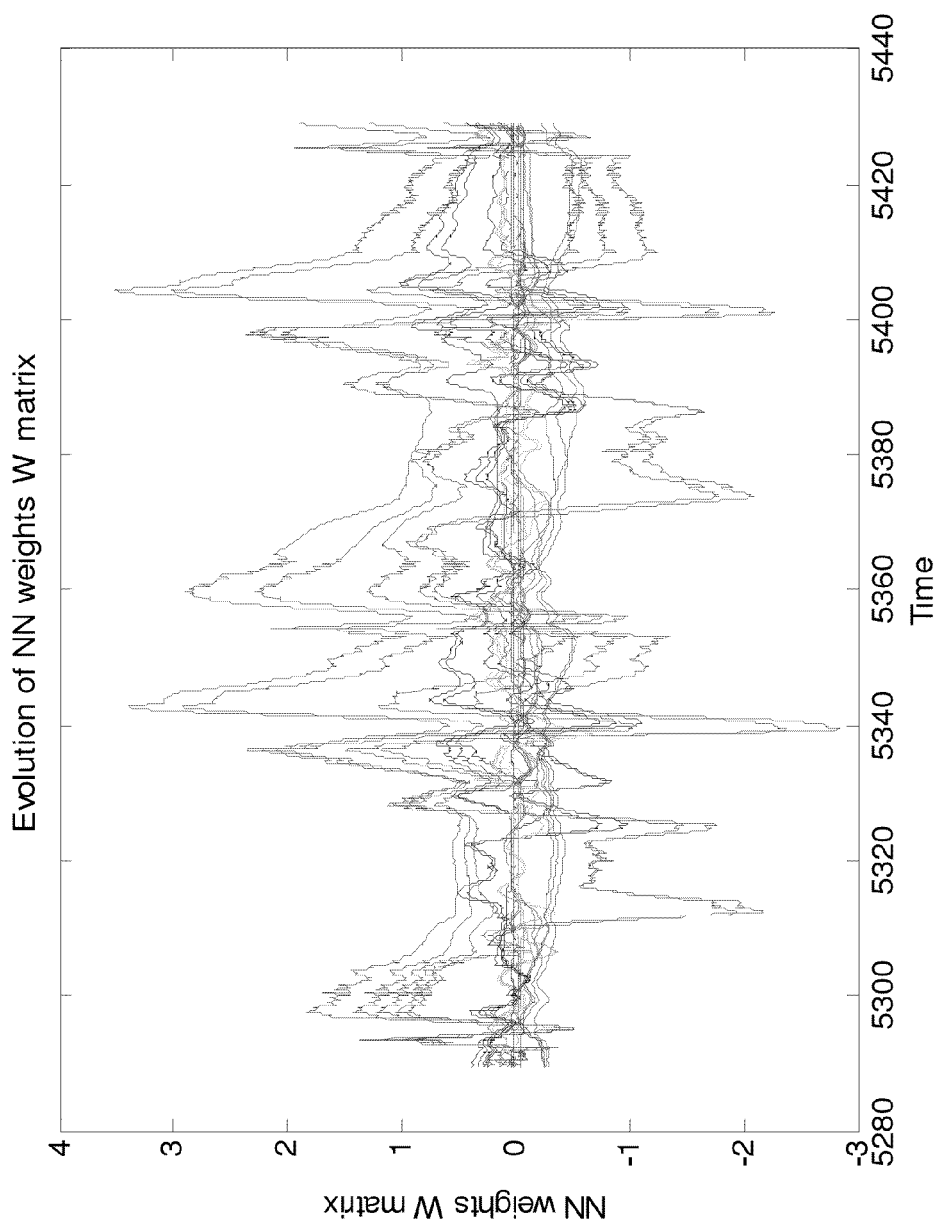

It is instructive to compare FIGS. 22-23, which show the evolution of the neural network weights with only online learning, with FIGS. 24-25, which show evolution of the neural network weights with combined online and concurrent learning. Although absolute convergence of weights is not seen, it is interesting to note that when using concurrent learning, the weights tend to be less oscillatory. In other words, the weights in FIGS. 22-23 appear to evolve to reactively suppress uncertainty. One could establish a clear correspondence between the patterns exhibited by the weights and the onset/end of position commands, as visible by large variations in the weights. Furthermore, as the position commands repeat, this pattern is seen to repeat. This correspondence is not visible in FIGS. 24-25. Additionally, when using concurrent learning, the adaptation is retained (i.e., the weights do not approach zero) when the UAS is hovering between two successive maneuvers. Further, the weights take on different values when using concurrent learning.

Figure 26:
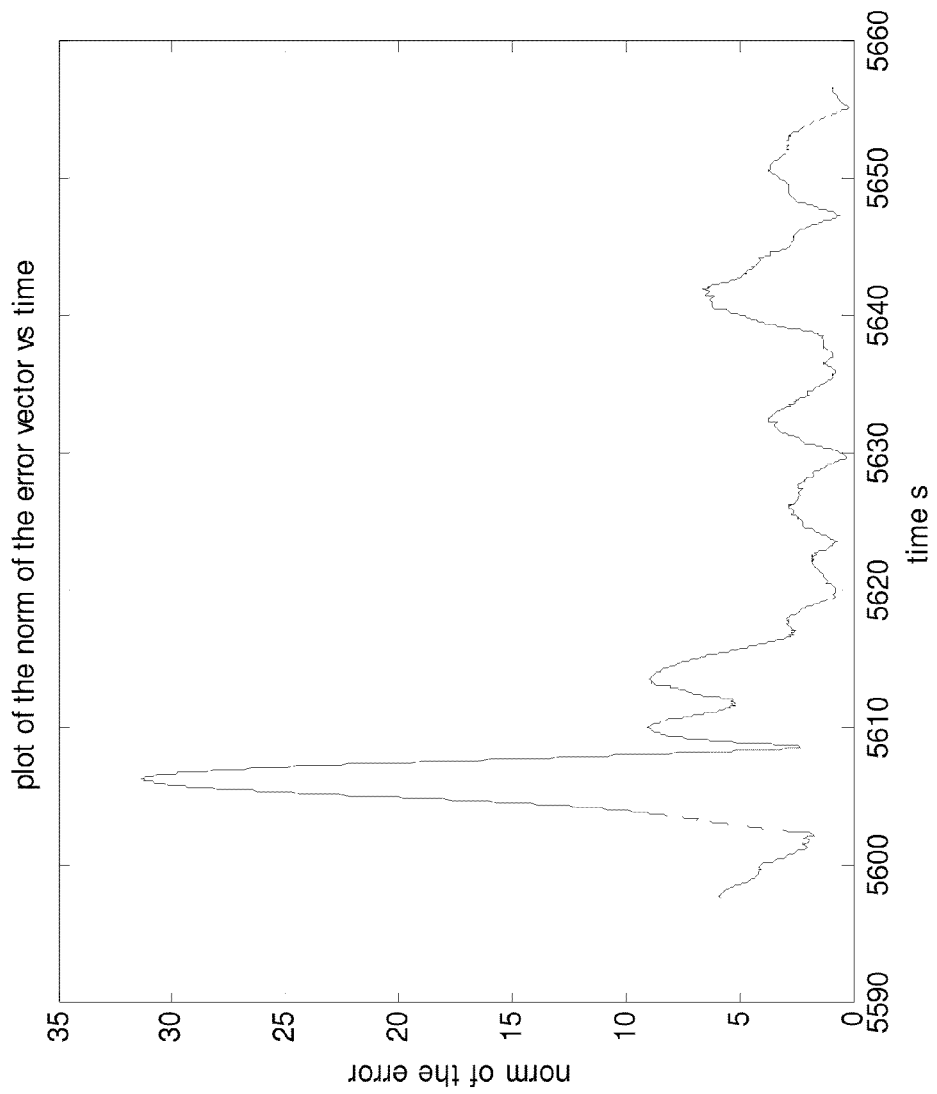
FIG. 26 is a graph illustrating evolution of the norm of a tracking error vector without concurrent learning when tracking aggressive trajectories, as implemented on the unmanned aerial vehicle.
Figure 27:
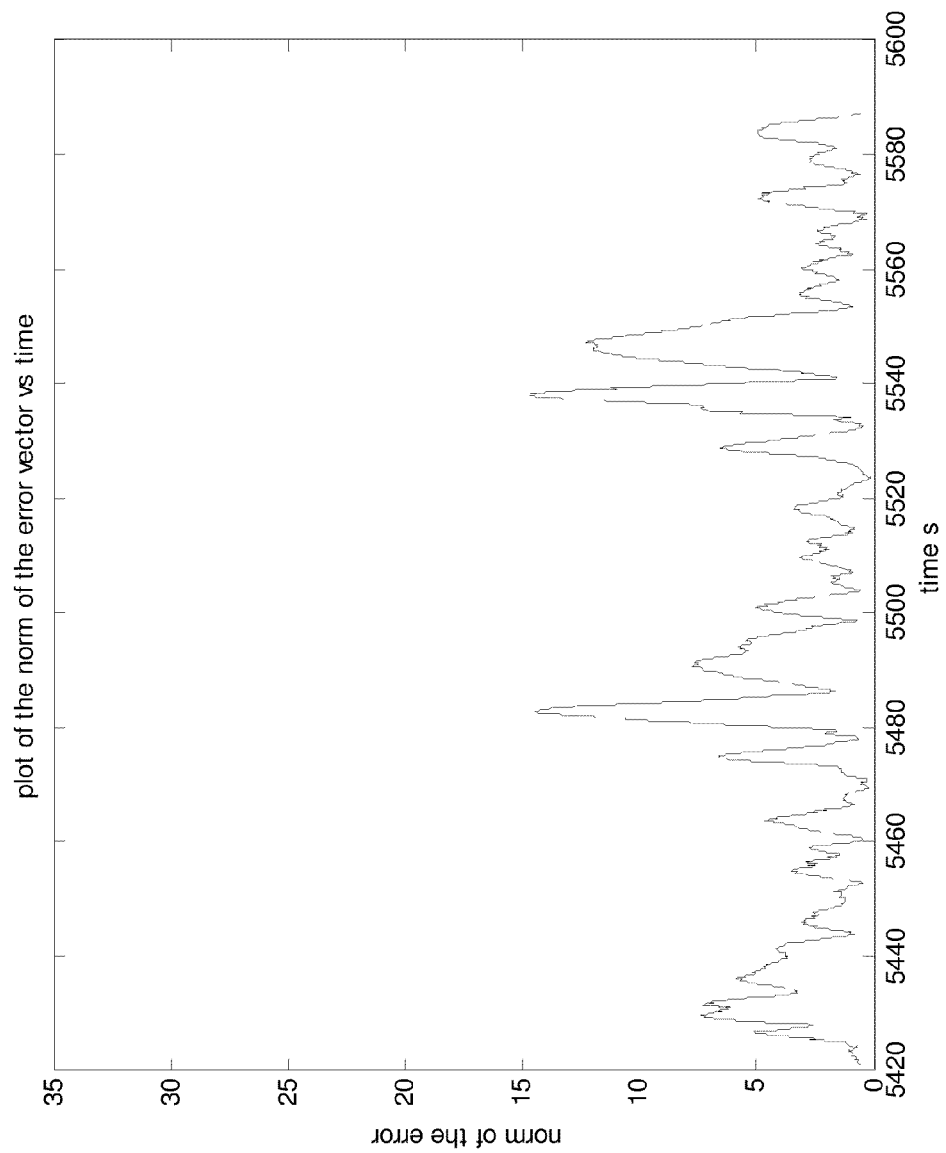
FIG. 27 is a graph illustrating evolution of the norm of the tracking error with concurrent learning when tracking aggressive trajectories, according to an exemplary embodiment of the present invention, as implemented on the unmanned aerial vehicle.

FIG. 26 shows the plot of the tracking error norm without concurrent learning evaluated at each time step. The peaks in the tracking error norms in these figures represent the beginning of a maneuver. It should be noted that FIG. 26 contains only one peak because data for only one maneuver without concurrent learning was recorded, whereas FIG. 27 contains two peaks as data for two consecutive maneuvers was recorded. Contrasting the peak of the tracking error norm in FIG. 26 with FIG. 27 illustrates that the norm of the error vector is significantly higher without concurrent learning, indicating that the combined online and concurrent learning adaptive controller has improved trajectory tracking performance.

V. Conclusion

Accordingly, as discussed above, the neural network adaptive control system 100 can guarantee global exponential tracking error and parameter error convergence to 0 in adaptive control of plants with linearly parameterized uncertainty, when using a concurrent learning method. If the structure of the uncertainty is unknown, the neural network adaptive control system can guarantee uniform ultimate boundedness of the tracking and parameter errors. The neural network adaptive control system 100 can specifically select and record data for use with current data concurrently for adaptation. This guarantee can be dependent on a condition, whereby the stored data has as many linearly independent elements as the dimension of the basis of the uncertainty. This condition on linear independence of the stored data is found to be less restrictive than persistent excitation and can allow a reduction in the overall control effort required. Further, in contrast to persistent excitation, this condition can be easily verified online.

While the invention has been disclosed in exemplary forms, many modifications, additions, and deletions can be made without departing from the spirit and scope of the invention and its equivalents, as set forth in the following claims.

What is claimed is:

1. A computer program product embodied in a non-transitory computer-readable medium, the computer program product comprising an algorithm adapted to effectuate a method comprising:
   providing a neural network comprising a plurality of estimated weights for estimating a linearly parameterized uncertainty;
   receiving past data in the neural network;
   recording one or more of the past data for future use;
   receiving current data in the neural network; and
   updating the estimated weights of the neural network, with a computer processor, based on concurrent processing of the current data and the selected past data, wherein convergence of the estimated weights to ideal weights is guaranteed when the recorded past data contains as many linearly independent elements as a dimension of a basis for the uncertainty.

2. The computer program product of claim 1, the neural network being integrated into an adaptive flight controller.

3. The computer program product of claim 1, wherein the estimated weights of the neural network are guaranteed to approach and remain bounded in a compact neighborhood of the ideal weights, if the uncertainty is unstructured.

4. The computer program product of claim 1, further comprising applying the estimated weights of the neural network to guarantee global exponential tracking error convergence in a model reference adaptive control architecture, when the uncertainty is structured.

5. The computer program product of claim 1, further comprising applying the estimated weights of the neural network to guarantee uniform ultimate boundedness of a tracking error in a model reference adaptive control architecture, when the uncertainty is unknown.

6. The computer program product of claim 1, the neural network being a single hidden layer neural network.

7. The computer program product of claim 1, the neural network being a radial basis function neural network, a series or parallel implementation of a single hidden layer neural network and a radial basis function neural network, a parameterized function approximator, or a linearly parameterized function approximator with a known basis.

8. The computer program product of claim 1, wherein the convergence of the estimated weights is independent of whether the inputs to the neural network are persistently exciting.

9. The computer program product of claim 1, the recorded past data being selected to contain as many linearly independent elements as the dimension of the basis for the linearly parameterized uncertainty.

10. The computer program product of claim 1, the method further comprising projecting a weight training algorithm based on the recorded past data onto the null space of a weight training vector obtained from the current data to update the weight training algorithm.

11. The computer program product of claim 10, the updated weight training algorithm having a matrix rank greater than one.

12. A system comprising:
   a neural network comprising a plurality of weights applicable to received data for estimating a paramaterized uncertainty;
   a storage device for storing recorded data of the neural network, the recorded data being selected to contain as many linearly independent elements as a dimension of a basis for the uncertainty; and
   a processor in communication with the storage device, for receiving current data and for updating the weights of the neural network by concurrently processing the recorded data along with the current data by orthogonally projecting a weight training algorithm of the recorded data onto the null space of a weight training vector of the current data;
   wherein convergence of the weights of the neural network is guaranteed regardless of whether the inputs to the neural network are persistently exciting.

13. The system of claim 12, the neural network having a single hidden layer.

14. The system of claim 12, the weight training algorithm having a matrix rank greater than one.

15. A computer-implemented method comprising:
   received data in a neural network, the neural network comprising a plurality of weights for estimating a linearly parameterized uncertainty;
   recording one or more of the received data, wherein the recorded data contains as many linearly independent elements as a dimension of a basis for the uncertainty;
   receiving current data in the neural network; and
   updating the weights of the neural network, with a computer processor, based on an orthogonal projection of a weight training algorithm devised from the recorded data onto the null space of a weight training vector of the current data, wherein convergence of the weights of the neural network is guaranteed.

16. The computer-implemented method of claim 15, the neural network remaining active in the absence of persistent excitation.

17. The computer-implemented method of claim 15, the neural network having a single hidden layer.

18. The computer-implemented method of claim 15, the weight training algorithm having a matrix rank greater than one.

19. The computer-implemented method of claim 15, wherein weight updates based on the recorded data are restricted to the null space of the weight updates based on current data.

* * * * *